(12) United States Patent
Park et al.

(10) Patent No.: US 8,166,029 B2
(45) Date of Patent: Apr. 24, 2012

(54) SYSTEM AND METHOD FOR IDENTIFYING MEDIA CONTENT ITEMS AND RELATED MEDIA CONTENT ITEMS

(75) Inventors: Seung-Taek Park, Glendale, CA (US); David Myer Pennock, Monroe Township, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 120 days.

(21) Appl. No.: 11/518,378

(22) Filed: Sep. 7, 2006

(65) Prior Publication Data
US 2008/0126303 A1 May 29, 2008

(51) Int. Cl.
*G06F 7/00* (2006.01)
(52) U.S. Cl. ........................................ 707/732
(58) Field of Classification Search .................. 707/102, 707/732
See application file for complete search history.

(56) References Cited

U.S. PATENT DOCUMENTS

| | | | |
|---|---|---|---|
| 6,499,029 B1 * | 12/2002 | Kurapati et al. | 707/5 |
| 6,564,213 B1 * | 5/2003 | Ortega et al. | 707/5 |
| 6,757,691 B1 * | 6/2004 | Welsh et al. | 707/104.1 |
| 6,970,859 B1 * | 11/2005 | Brechner et al. | 707/3 |
| 2003/0028889 A1 * | 2/2003 | McCoskey et al. | 725/91 |
| 2004/0177063 A1 * | 9/2004 | Weber et al. | 707/3 |
| 2005/0021653 A1 * | 1/2005 | Song et al. | 709/207 |
| 2005/0228788 A1 * | 10/2005 | Dahn et al. | 707/3 |
| 2006/0129446 A1 * | 6/2006 | Ruhl et al. | 705/10 |
| 2006/0167859 A1 * | 7/2006 | Verbeck Sibley et al. | 707/3 |
| 2006/0277174 A1 * | 12/2006 | Klausberger et al. | 707/5 |
| 2007/0214133 A1 * | 9/2007 | Liberty et al. | 707/5 |

* cited by examiner

*Primary Examiner* — Jensen Hu
(74) *Attorney, Agent, or Firm* — Antonio Papageorgiou; Ostrow Kaufman LLP

(57) ABSTRACT

A method comprising receiving a search query to generate a search result of one or more media items and providing a personalized search rank of the one or more media items on the basis of a user profile and an item relevance for a given media item with regard to the query metadata associated with the search result is identified and used to identify at least one related media item. The at least one related media item is ranked on the basis of the user profile and the metadata.

15 Claims, 23 Drawing Sheets parkst's queries alien bug  anderson  arnold  arnold action  arnold mars  bug alien  bug science  bug war  bug war science  bugs war  fanny alexander  fantas mam  fantasy mam  gandalf  guard inmate john  hell  knight moves  matrix  neo  trinity  redemption  starship  terminator  terminators  the adventurer  volfgang parkst's movies

Air Force One (F)  Apollo 13 (B)  Arnold Schwarzenegger DVD 2-Pack - Sixth Day/Last Action Hero(2003) ()  Assassins ( )  Back to the Future (A-)  Ben-Hur ( )  Castle in the Sky(1986) (A)  Die Hard (A)  Empire Strikes Back (B+)  Face/Off (A-)  Fletch ( )  Forrest Gump (A)  Gladiator ( )  Hoodlum ( )  Indiana Jones and the Temple of Doom (A)  Jurassic Park (A-)  Jurassic Park III (F)  Last Action Hero (B-)  Lord of the Rings: Fellowship of the Ring (A)  Lord of the Rings: Two Towers (A)  Mask (A)  Matrix (A+)  Matrix Reloaded (B+)  Matrix Reloaded: IMAX Experience ( )  Matrix Revolutions (B+)  Much Ado About Nothing ( )  Once In Life ()  Pirates of the Caribbean: Curse of the Black Pearl (B-)  Princess Mononoke (A)  Pulp Fiction ( )  Raiders of the Lost Ark (A)  Rain Man (A+)  Return of the Jedi (B)  River's Edge (A)  Rocky (A-)  Rocky II ( )  Rocky IV (D)  Saving Private Ryan (A)  Shrek ( )  Silence of the Lambs (A)  Snatch ( )  Speed (A)  Star Wars (A+)  Terminator (A-)  Terminator 2 - Judgment Day (A+)  Toy Story ( )  Transformers: Movie ( )  True Lies (B)  X2: X-Men United (B)  Youngblood ()

parkst's people

Al Pacino (A+)  Andy Wachowski ( )  Anthony Hopkins ( )  Arnold Schwarzenegger (A-)  Brad Pitt (A-)  Brian Cox ( )  Bruce McGill ( )  Bruce Willis (A-)  Carl Weathers ( )  Carrie Fisher (B-)  Carrie-Anne Moss ( )  Christopher Walken ( )  Danny Aiello ( )  Diane Keaton ( )  Dominic Chianese Jr. ( )  Drew Barrymore ( )  Elijah Wood ( )  Francis Ford Coppola ( )  Gene Hackman (A)  George Lucas (A-)  Harrison Ford (A-)  Hayao Miyazaki (A)  Hugo Weaving ( )  Ian McKellen ( )  Jack Nicholson (A)  James Cameron (A-)  Joe Pantoliano ( )  Joel Silver ( )  John McTiernan ( )  John Randolph ( )  John Rhys-Davies ( )  Keanu Reeves (A-)  Kevin Spacey ( )  Kylie Travis ( )  Larry Wachowski ( )  Laurence Fishburne ( )  Morgan Freeman (A-)  Peter Jackson (A)  Rob Lowe ( )  Robert De Niro (A+)  Robert Duvall ( )  Samuel L. Jackson (B+)  Sean Astin ( )  Sean Connery (A-)  Steven Spielberg (A+)  Sylvester Stallone (F)  Talia Shire ( )  Tom Cruise (B+)  Tom Hanks (A)  Viggo Mortensen ( )

parkst's genres

FIG. 5A

Top 20 recommendations for parkst

1. Rebecca (1940)
2. The Joy Luck Club (1993)
3. The Transformers: The Movie (1986)
4. Some Like it Hot (1959)
5. The Magnificent Seven (1960)
6. 12 Angry Men (1957)
7. Band of Brothers (2001)
8. Lawrence of Arabia (1962)
9. Lonesome Dove (1990)
10. Terms of Endearment (1983)
11. T2 The Ultimate Edition DVD (1991)
12. Lady and the Tramp (1955)
13. In the Name of the Father (1993)
14. Star Wars Trilogy
15. Of Mice and Men (1992)
16. It's a Wonderful Life (1946)
17. Dr. Strangelove or: How I Learned to Stop Worrying and Love the Bomb (1964)
18. The Great Escape (1963)
19. American History X (1998)
20. Requiem for a Dream (2000)

— 680

— 690

Top 20 recommended actors/directors for parkst

1. Clint Eastwood
   Dirty Harry (1971)  Escape From Alcatraz (1979)  Fistful of Dollars (1964)  For a Few Dollars More (1965)  The Good, the Bad and the Ugly (1966)  High Plains Drifter (1973)  Kelly's Heroes (1970)  The Outlaw Josey Wales (1976)  Unforgiven (1992)
2. Rob Reiner
   The Princess Bride (1987)  Stand by Me (1986)  When Harry Met Sally... (1989)  Misery (1990)  A Few Good Men (1992)  This is Spinal Tap (2003)
3. Joel Coen
   Raising Arizona (1987)  The Big Lebowski (1998)  Miller's Crossing (1990)  The Hudsucker Proxy (1994)  Fargo (1996)  Blood Simple (2000)
4. Dennis Hopper
   Apocalypse Now (1979)  Easy Rider (1969)  Hoosiers (1987)  True Romance (1993)  Speed (1994)  Apocalypse Now Redux (2001)
5. Robert Duvall
   Apocalypse Now (1979)  M.A.S.H. (1970)  The Natural (1984)  To Kill a Mockingbird (1962)  The Godfather Part II (1974)  Apocalypse Now Redux (2001)
6. Alfred Hitchcock
   The Birds (1963)  North by Northwest (1959)  Psycho (1960)  Rear Window (1954)  To Catch a Thief (1955)  Vertigo (1958)
7. Denzel Washington
   Glory (1989)  Malcolm X (1992)  Much Ado About Nothing (1993)  Philadelphia (1993)  Remember the Titans (2000)  Antwone Fisher (2002)
8. Johnny Depp

FIG. 5B

Ordered by the collaborators with explicit rating

FIG. 9

People presentation ordered by collaborators

Search results by global ranking based on mad-rank

SYSTEM AND METHOD FOR IDENTIFYING MEDIA CONTENT ITEMS AND RELATED MEDIA CONTENT ITEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The technical field generally relates to indexing and ranking media content items and providing a search engine for locating media content items and related media content items.

BACKGROUND

Search engines are available that allow users to search through specialized sets of electronic documents/files, such as electronic movie content. These search engines that provide search functionality of specialized media documents are referred to herein as media content search engines. Media content search engines, such as the Internet Movie Database and Yahoo! Movies, provide databases of movies and movie information that are searchable using search terms, such as keywords found in a movie title, actor name, or director name. Such media content search engines are useful when a user knows something about the media content that they are attempting to locate.

When a keyword is known, a user may enter the keyword in the search engine, which will match media content items in the media content database and return search results. In conventional media content search engines, the search results are typically ranked by search matching score. If a searched keyword is a general term or a term marginally related to the media content, the user may be presented with a list of largely irrelevant search results.

Some conventional media search engines, including the Internet Movie Database, present search results together with lists of links to related media content. Such related media content includes, for example, lists of links to information about actors appearing in a movie and to other recommended movies. However, the determination of such lists of links to related media content does not account for the relevance of the related media content to the user's search and are not ranked in a meaningful way. The list of links may include links to media content that the user deems irrelevant. In this scenario, a user may have to navigate through many unhelpful links, or may be unable to locate desired media content.

SUMMARY OF THE INVENTION

Systems and methods search for media content items, such as movies, television programs or other audio or video content, as well as information regarding the media content items and related media content items. According to some embodiments, a user using a client device such as a computer, telephone, personal digital assistant, television set top box, or other client device, submits search terms using a user interface that the client provides for supplying one or more search terms. For example, a user may enter search terms into a web page or other interface that a search engine provides. The client device communicates the search terms over a network to a server. The server is communicatively coupled to a database containing media content items, as well as metadata relating to the media content items. Metadata relating to media content may include, for example, data identifying the media content, such as title, characters, plot, genre, crew, actors, ratings, reviews and other media content metadata.

The server searches the database for media content items on the basis of the search query. The server may rank results from the search query in accordance with various parameters, such as item relevance against the search query, an explicit rating (a rating specifically assigned to a media content item or some aspect of media content by the searcher), a predicted rating (an expected preference of the searcher to the media content item or some aspect of media content, which is calculated by the server on the basis of preference information in one or more user profiles), a global, community or third party rating, other parameters, or combinations of these parameters. The ranked search results are returned to the client device together with links to related media content items, which may alternatively or additionally include information regarding related media content items. The links to related media content items may also be ranked in accordance with the various parameters.

According to one embodiment, a list of search results is provided in ranked order and the search results are presented with links to one or more related or recommended media content items, such as movies connected by common collaborators. Examples of movies with common collaborators include movies having at least one common actor, director, or other cast or crewmember with the selected media content item. In some embodiments, a user's use of the search results may be tracked and incorporated into the user preference profile.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 5A is a screen shot of a user preference profile according to one embodiment of the present invention;

FIG. 5B is a screen shot of a recommendation list for the movies and actors/directors for the given user (e.g., Parkst) in the personal profile stage according to one embodiment of the present invention;

FIG. 9 is a screen shot of a movie selection with connected movies ordered by the number of common cast and crew between two movies and related movies based on item similarities in user preferences according to one embodiment of the invention;

FIGS. 12A and 12B are a screen shot of a people presentation with his or her collaborators ordered by the number of collaborations between two the people according to one embodiment of the invention;

FIG. 14 is a screen shot of search results by global ranking based on MADRank according to one embodiment of the invention;

FIG. 15 is a screen shot of personalized search results by ranking based on DB-cording Rank according to one embodiment of the invention;

FIG. 16 is a screen shot of personalized search results by ranking based on MADRank according to one embodiment of the invention;

FIG. 19 is a screen shot of search results from a misspelled set of keywords according to one embodiment of the invention.

DETAILED DESCRIPTION OF PREFERRED EMBODIMENTS

Figure 1:
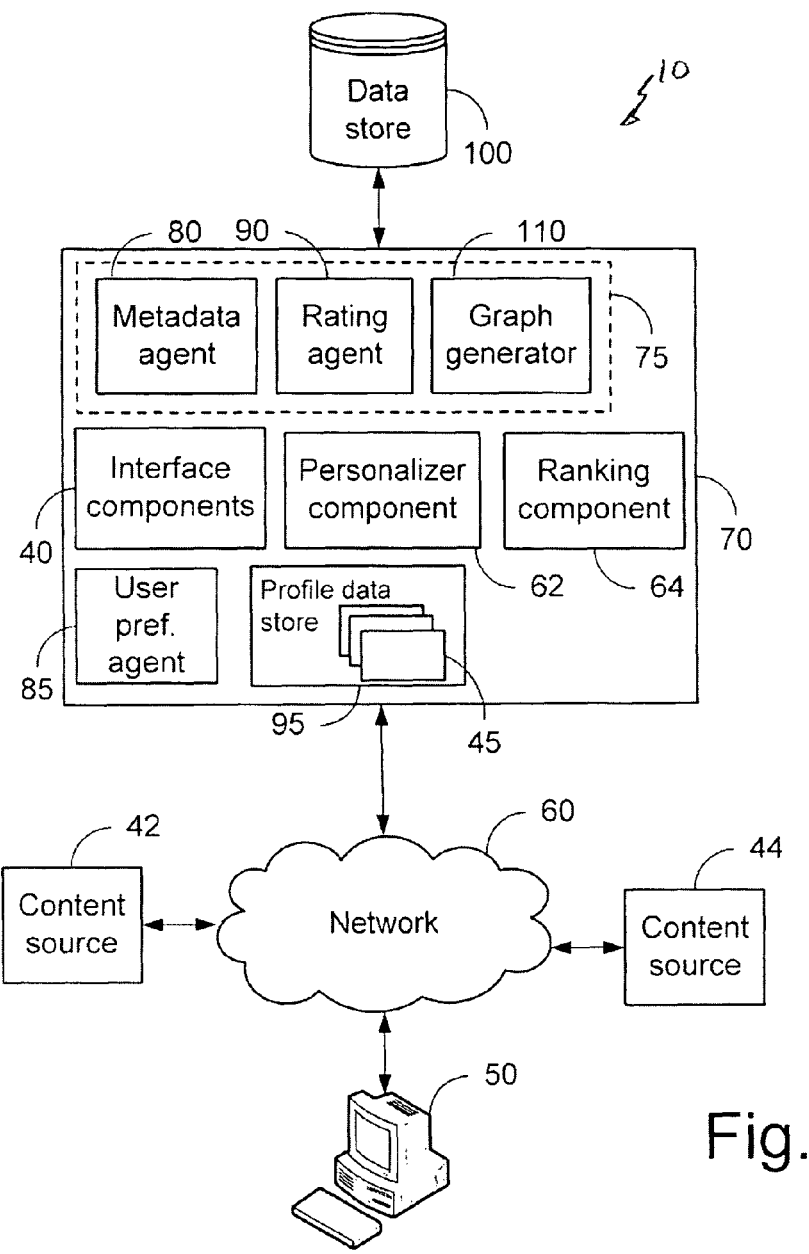
FIG. 1 is a block diagram illustrating a system that allows for searching media content items according to one embodiment of the present invention.

FIGS. 1-20 present various embodiments of systems, methods and interfaces that enable searching of media content. An exemplary system 10 is depicted in FIG. 1. As shown, the system 10 includes a client device 50 coupled via a network 60 to a server 70, which in turn is coupled to a data store 100. The server 70 comprises one or more interface components 40, a personalizer component 62, a ranking component 64, a user preference agent 85 and a profile data store 95, which provides persistent storage for one or more profiles 45, each profile 45 comprising data regarding media preferences for one or more users, e.g., a personal profile or a community profile. The server 70 also comprises one or more "off line" components 75 that process information regarding media files on an ongoing basis without interaction with a client 50. The components 75 include a metadata agent 80, a rating agent 90 and a graph generator 110. The functionality described may be performed by one or more components. The components and data structures need not be run by a single server 70, and may operate in a distributed manner on a number of different devices in communication over the network 60.

The client device 50, which may include one or more client devices in communication with the server 70 over the network 60, may be any device capable of receiving data from a user and transmitting the data to the server 70, as well as capable of receiving data from the server 70 and displaying or otherwise communicating the received data to the user. A client device 50 may include a personal computer, a television set top box, a mobile telephone, personal digital assistant (PDA), or other device.

The network 60 may be any network capable of communicating data from the client device 50 to the server 70, such as, the Internet, a local area network (LAN), a wide area network (WAN) or another network or combinations thereof.

Possibly offline, the metadata agent 80 parses information describing media content, which the metadata agent 80 may receive from one or more content sources 42 and 44. According to one embodiment, the content sources 42 and 44 may include the Yahoo! Movies database and/or the IMDB movies database, each of which contain information describing a given media content item, including title, casting information, explicit user ratings, etc. The metadata agent 80 associates media content with metadata relating to the media content. For example, the metadata agent 80 may store data relating to a movie in association with its metadata such as its title, cast, characters, director, producer, genre, popularity, plots, general ratings, MPAA ratings, award information, lease date, the summary of reviews from critics and users, theater information, captions, ranking information or other metadata relating to or describing the media content. In addition to obtaining metadata regarding media content items from one or more content sources 42 and 44, the metadata agent 80 may obtain metadata from other sources including, for example, from the given media content item itself, public and private databases, online resources, or other sources.

The metadata agent 80 stores the metadata in the data store 100. The data store 100 may be any data structure capable of storing data in an organized and structured fashion. According to some embodiments, the data store 100 includes data and metadata relating to media content items, such as movies, television programs, or other audio and/or video media content. The data in the data store 100 may be obtained from one or more data sources, such as publishers, recording companies, production companies, reviewers or other sources of media content. The data store 100 may be a relational database in which data relating to each media content item is stored in association with related data, such as data indicating another related media content item. The data store may be a tab-delimited data store, a comma delimited data store, an object database, a hybrid object-relational database and/or other data stores known to those of skill in the art.

The rating agent 90 generates non-personalized overall ratings for classes of items that the data store 100 contains: movies, directors and actors. The rating agent 90 may also aggregate a community profile for a media content item relating to ratings from a community of users, such as an explicit rating provided by one or more users within a community of users. In one embodiment, a community preference profile is an aggregation of one or more user preference profiles 95. The rating agent 90 stores these non-personalized ratings in the data store 100 for use by other components of the system 10 when an explicit or predicted rating is unavailable for use in ranking a given media content item.

In one embodiment, the graph generator 110 is operative to generate two types of graphs from metadata and rating information. The first graph is referred to as the "movie-casting graph", which relates actors, directors, cast members, etc. and one or more movies. The second graph is referred to as the "movie-user" graph, which relates a plurality of movies on the basis of preference and rating information that other components of the system 10 generate, such that given a first movie, the system 10 may determine one or more movies that relate to the first movie. According to one embodiment of the invention, the graph generator 110 generates the movie-user graph on a per-user basis whereby graphs for various users may be related, e.g., when two users rate the same movie, actor, director, etc. Alternatively or additionally, the graph generator 110 may generate one or more aggregate user-movie graphs for one or more communities or groups of users. The graph generator 110 stores the graphs in the data store 100.

The user preference agent 85 tracks, maintains, stores and otherwise utilizes user preferences in one or more preference profiles 45 that the profile data store 95 maintains, including maintenance of explicit ratings for media content items. In some embodiments, the user preference agent 85 tracks data relating to a user, such as a user's search query history, a user's explicit preferences, user-defined ratings and/or other information relating to media content items, including ratings for or indications of interest in movies, actors, or genres of movies, and movies viewed or visited by a user. Preference information may be stored in one or more profiles 45 in the profile data store 95.

The user preference agent 85 stores data relating to each of a user's prior search queries. In some embodiments, user search queries are stored in one or more profiles 95 in association with data relating to a user's subsequent use of the search query results. For example, data relating to a selection of a particular item in a result set generated based on a user search query may be stored in association with the search terms of the query. Such selection information may provide, for example, an indication of user interest in the particular result (e.g., a rating), which may be used when ranking results. In addition to maintaining profiles 45 for individual users, the profile data store 95 may provide persistent storage for community or group profiles 45 indicating the preferences for a group or community of users.

The user preference agent 85 also provides other personalization features. The user preference agent 85 analyzes query and interaction information (e.g., how the user interacts with items in a result set) in the user profiles 45 to provide personal information to a user. For example, what search terms appear most frequently in user queries, what movies and people the user visited most, either directly or indirectly, the user's favorite genres, etc. The user preference agent 85 may also provide a user with personalized top recommendations, for example, the top ten rated movies, directors, etc. for a given user. Alternatively or in conjunction top recommendations may be provided across a community or group of users. According to one embodiment, the user preference agent 85 may generate recommendations for movies using an item-based collaborative filtering algorithm, whereas actor/director recommendations may be produced on how many "A" rated movies, either explicit or predicted, in which the actor has starred.

The client device 50 communicates data, such as search terms or criteria in a search query, to the server 70 via the network 60. The server 70 may be any device capable of performing a search in response to a query and supplying search results. In some embodiments, a user may enter search criteria into a user interface that one or more interface components 40 provide for display on the client device 50. The server 70 searches a database 100 containing data related to media content for data satisfying the search criteria. As discussed in detail below, the ranking component 64 may rank the search results automatically in accordance with parameters, e.g., item relevance against the search query, a user preference profile, a community preference profile, other preferences, ratings or other parameters. The search results may be forwarded by the interface components 40 to the client device 50 via the network 60 together with links to related media content items or metadata regarding the same.

The server 70 provides one or more interface components 40 that provide controls to allow the client device 50 to interact with the server 70. The interface components 40 handle searches from clients 50 for media content items and/or metadata regarding the same, and presentation of media content items and/or metadata regarding the same. When the interface components 40 receive a query from a given client 50, the interface components 40 execute the query against information that the data store 100 maintains. The data store 100 retrieves matching items that it sends to the personalizer component 62 for rating, possibly only in the absence of explicit rating information. According to one embodiment, the data store 100 performs a matching AND search for movie data (returning matches that contain all the terms in a given query), and a matching OR search for person data (returning matches that contain any query terms in a given query), which may be an actor, director, other cast member, etc.

The personalizer component 62 may utilize a user preference profile 45, which may be an individual preference profile, a community profile or other rating data, to provide actual or predicted rating information for a media content item that the data store 100 returns. The personalizer component 62 may associate rating information with media content and perform other rating operations.

The personalizer component 62 may generate predicted ratings for a given media content item and metadata associated with the given media content item, possibly based on a user preference profile or other parameters. In general, the personalizer component 62 may generate predicted ratings using an item-based collaborative algorithm, heuristic rating algorithm or other algorithm. Badrul Sarwar, George Karypis, Joseph Konstan, and John Reidl, "Item-based collaborative filtering recommendation algorithms". The proceeding of the 10th World Wide Web Conference, 285-295, 2001, Hong Kong China. In one embodiment, if no user preference profile data is available, the personalizer component 62 generates a predicted rating on the basis of an average user rating, the number of users who supplied a rating, an award score and an average critic rating. The personalizer component 62 may generate output indicating the rating data for each media content item rated by the personalizer component 62, as well as ratings for other metadata items (e.g., actors, directors, etc.).

The ranking component 64 gathers all rating information for one or more given media content items. Available rating information includes global rating information from the rating agent 90, explicit rating information that profiles 45 maintain and/or predicted rating information from the personalizer component 62. On the basis of rating information, the ranking component 64 dynamically generates a personalized ranking of the result set.

The ranking component 64 may perform ranking on the basis of a relevance judgment algorithm, which is a combination of authorities (e.g., ratings) and proximities (e.g., similarities between specific metadata for a given media content item and terms in a given query) of the items that the data store 100 returns. One example of the proximities of the returned items is the relevance or similarity between media content items (or data associated with a media content item, such as a title or character) and terms comprising a given search query. In some embodiments, proximity is measured in a logical manner. For example, proximity may be obtained by counting the number of bigrams and unigrams in a search query that appear or match data in a metadata field associated with a media content item, such as a title, actor name, crew name, or other metadata.

The system 10 may calculate a proximity score by combining bigram and unigram scores with a score for a match in other metadata fields, such as plot summary, character names or other metadata. In general, title and bigram matches may have greater weight than other matches. Some ranked search results, recommended media content, or other media content, are obtained using the bigram score of the matching search results. In some embodiments, if there is a tie in the bigram score, the system 10 uses the unigram score. If there is also a tie in the unigram score, the authorities or ratings of the matching search results are used to break the tie.

In other embodiments, search results are ranked according to a combination of proximities (or relevance) and authorities (or ratings). For example, a search result ranking can be obtained using the formula presented in Table 1:

TABLE 1

$$\text{Rank}(i) = 2 * \text{Authority}(i) + \text{Proximity}(i)$$

In this formula, Proximity is the relevance (or similarity) between a query and an item. When a client 50 submits a query, the ranking component 64 calculates relevance score of the title (RSt(i)), name fields (names of actors, directors, and characters; RSn(i)), genre (RSg(i)), and all indexed fields (RSa(i)) over the query. According to one embodiment, these relevance scores may be calculated using the internal "match" function that MySQL provides (e.g., match(fields) against (queries)). The proximity may then be measured according to a weighted summation of these relevance scores. In some embodiments, a media item title may be assigned a greater weight in a relevance score relative to the weight assigned to name fields, genres or other fields, e.g., Proximity(i)=3*RSt(i)+RSn(i)+RSg(i)+RSa(i).

The authority value that the ranking component 64 uses in the formula of Table 1 may be calculated according to one or more types of authority, including an explicit rating, a predicted rating, and a global popularity. Explicit ratings are actual ratings entered by a user, which the user preference agent 85 captures for persistent storage in a user profile 45 in the profile data store 95. The personalizer component 62 calculates predicted ratings on the basis of a preference profile 45 for the user that the profile data store 95 maintains. For example, the personalizer component 62 may calculate predicted ratings of unrated movies according to an item-based collaborative algorithm. When the ranking component 64 does not have an explicit rating for a media content item and cannot provide a predicted rating due to a lack of user preference information, the ranking component 64 may apply global popularity that the rating agent 90 calculates on the basis of the cumulative preferences of all of system 10 users. The global popularity of a given media content item, "i", may be the sum of one or more factors, including: average user rating (avg(i)), the number of users who rated an item i (n(i)), an award score, and an average critic rating. Thus, in some embodiments, global popularity may be calculated according to the formula of Table 2:

TABLE 2

Global Popularity = (avg(i) + log(n(i))/k + log(award_score) + avg_critic_rating)/3

According to the global popularity formula illustrated at Table 2, k is a normalized factor such that the highest popularity of movies is always 13.

Users may also rate actors, directors, other cast members, etc., and the ranking component 70 may generate global popularity ratings regarding the same. In some embodiments, the system 10 provides global popularity of actors and directors, using factors including a normalized sum of the top movies for a given actor, top movies for a given director, etc. According to one embodiment, individuals, who participate in a movie as an actor and a director, are only counted once. To avoid overemphasizing some actors, a credit line limitation may be used such that that actors in a movie may be limited to only movies in which the actor played a major role, e.g., credited as one of the top five actors in the movie.

The ranking component 64 may produce a ranked result set comprising links to media content items or information regarding the items. The interface components 40 may generate or receive controls for presentation to the user, e.g., other user interface elements known to those of skill in the art. The interface components 40 transmit the ranked result set and any additional user interface or client side components over the network 60 to the client 50. The client 50 receives the data and renders them on a display device (not pictured) for the user.

Figure 2A:
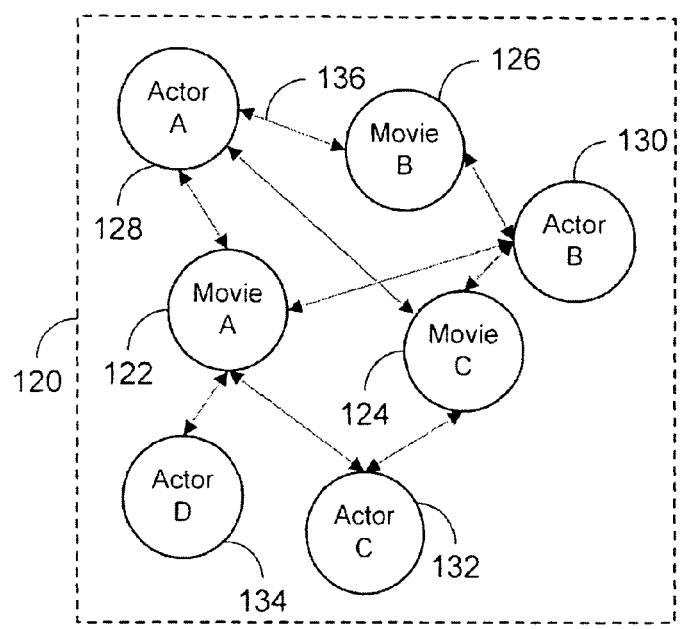
FIG. 2A is a block diagram illustrating a movie-casting graph according to one embodiment of the present invention.

FIG. 2A illustrates a movie-casting graph according to one embodiment of the present invention. The movie-casting graph 120 comprises one or more movie nodes 122, 124, 126 and one or more actor nodes 128, 130, 132, 134. The movie-casting graph 120 is a bipartite and undirected graph where the nodes represent two disjoint classes: movies and actors, e.g., directors, cast members, etc. The disjoint classes of movies and actors are joined by a rule. According to the present embodiment, a link is created between two nodes, an actor A and a movie M, if and only if the actor A starred in the movie M. As can be seen by the movie-casting graph 120, a link 136 exists between actor A 128 and movies A, B and C, 122, 124 and 126, respectively, as well as between actor B 130 and movies A, B and C, indicating that actors A and B starred in movies A, B and C. Similarly, actor C 132 is linked to movies A and C, 122 and 124, respectively, while actor D 134 is linked only to move A 122. Using the movie-casting graph 120, a user may easily find and browse between a series of movies on the basis of common actors.

Figure 2B:
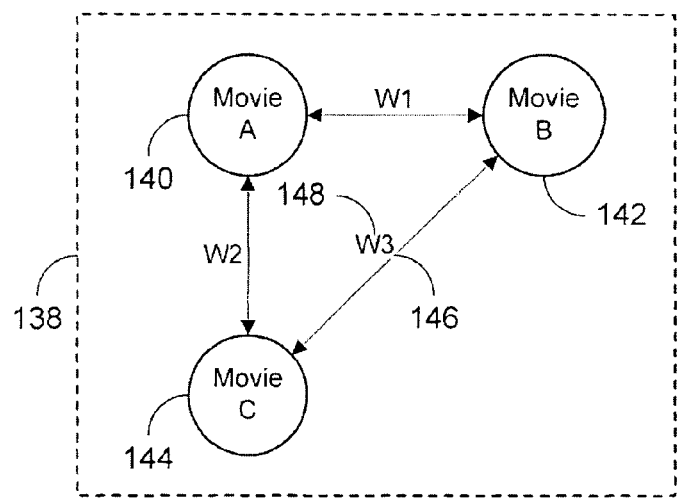
FIG. 2B is a block diagram illustrating a movie-user graph according to one embodiment of the present invention.

FIG. 2B illustrates a movie-user graph according to one embodiment of the present invention. The movie-user graph 138 comprises one or more nodes 140, 142, 144 wherein each node represents a movie. The graph 138 is an undirected and weighted graph, whereby each node is linked to another node by a link 146 upon the satisfaction of a rule. According to the rule, nodes 140, 142, 144 represent movies and a link is added between two nodes if and only if at least one user provides explicit ratings for the two movies. Each link 146 has an associated weight value 148, whereby the weight 148 of the link 146 is the similarity between two given movies in the user rating space. Adjusted Cosine Similarity may be used to calculate the similarity between any two nodes 140, 142, 144. Using the movie-user graph 138, a user may find and browse movies similar to a given movie. When the user selects a given media content item, the system 10 may use the movie-user graph 138 to identify and present similar media content items.

Using the movie-casting graph 120 with the user-movie graph 138, the system 10 enables the user to find and browse related movies.

Figure 3:
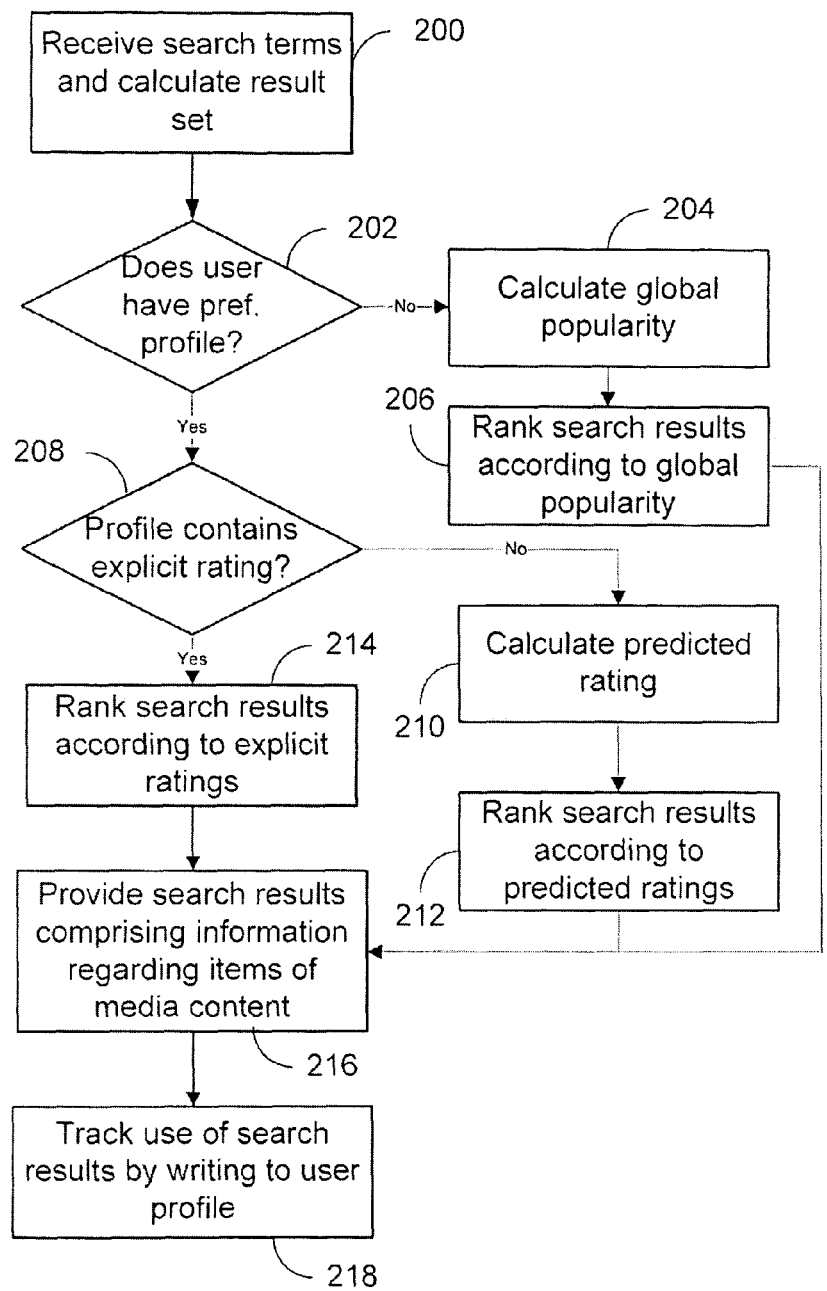
FIG. 3 is a flow diagram illustrating a method for searching media content items according to one embodiment of the present invention.
Figure 4:
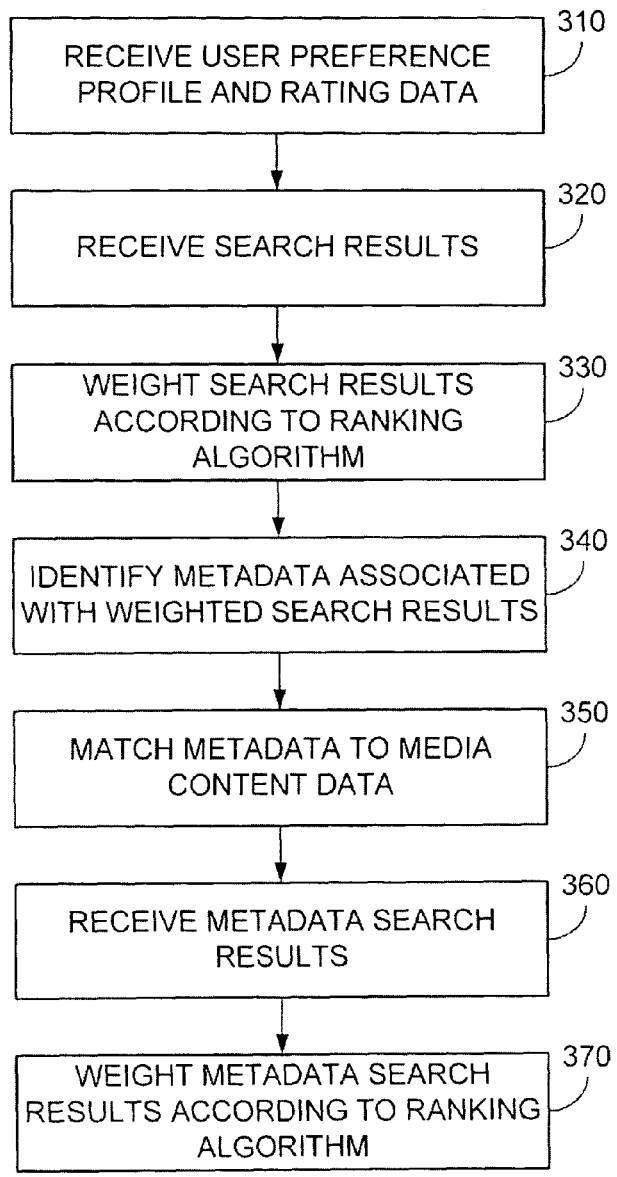
FIG. 4 is a flow diagram illustrating a method for ranking search results according to one embodiment of the present invention.

One embodiment of a method for searching media content items is presented by the flowchart of FIG. 3. A user enters a search query into a client device. The system receives the search query and calculates a result set of media content items and/or information regarding the items, step 200. The system creates the result set by searching one or more data stores for media content items and information (e.g., metadata) regarding the items that match the search query. In some embodiments, relational inference algorithms and relevance judgment algorithms may be used in conducting a search. Furthermore, a search may be conducted as an AND matching search, e.g., for a movie class, while at the same time conducting as an OR matching search, e.g., for a person class.

The system receives the results of the search query and determines whether the user has a preference profile, step 202. In some embodiments, a preference profile may be obtained by querying a user preference agent or other system component for user preference information, which may be stored on a persistent storage device according to one or more user or group preference profiles. If the user does not have a preference profile, the system may calculate a global popularity for a given item in the result set, which may also be pre-computed and maintained with the given media content item, step 204. For example, in the case when a user does not have a preference profile, the search results are ranked according to a global popularity for a given media content item, which may include a consideration of a number of factors such as a community preference profile, general rankings, global ratings, relevance of terms, proximity of returned items, link characteristics of items in the results set, or other ranking or weighting factors. The result set is ranked according to the global popularity of items contained therein, step 206.

Where the check performed at step 202 evaluates to true and the user has a preference profile, a check is performed to determine if the user's preference profile contains explicit ratings for media content items in the result set, step 208. Where the user's preference profile does not contain an explicit rating for a media content item, step 208, the system calculates a predicted rating for the media content item, step 210. A predicted rating for a media content item may be calculated on the basis of one or more items of information contained in the user's preference profile. For example, where the user's preference profile indicates a high preference for science fiction movies, as well as a high preference for movies starring Keanu Reeves, the system predicts that the user will rate movies highly in which both theses preferences are present. The system ranks the result set according to the predicted ratings of items contained therein, step 212.

Where the check performed at step 208 evaluates to true, indicating that the user's preference profile contains explicit ratings for media content items in the result set, the result set is ranked according to the explicit ratings, step 214. The result set may be transmitted over the network from the system to a client device and displayed on the client device, step 216. In some embodiments, the search results may be transmitted together with data or links to data indicating other relevant media content, such as recommended movies, recommended actors, similar movies, or other related media content.

The system may track the user's search query, the user's use of the result set, such as items viewed, ordered, or otherwise utilized by the user, in addition to other user activity, step 218. The system stores such tracking information, e.g., using a user preferences agent, or other system component, in the user preference profile.

According to a variation of the method of FIG. 3, the system may traverse a result set one item at a time, evaluating a given item in the result set against the checks at steps 202 and 208, thereby generating a global popularity, step 204, a predicted rating, step 210 or an explicit rating, step 214, for the given item in the result set. The system calculates a rating for each item in the result set and ranks the result set according to the ratings of the items of content information and/or information regarding the same. The system provides the ranked result set to the user, step 216, and tracks the user's interaction with items comprising the result set.

If a user has a preference profile, the system may weight or rank items in the result set in accordance with the user's preference profile. According to some embodiments, the system weights or ranks items in the result set in accordance with the preference profile as presented in the flow diagram illustrated in FIG. 4. When the system determines that the user has a preference profile, the user preference profile and any other data relating to rating of items media content is received, step 310. The user preference profile may include data relating to a user preference, such as a user's recent search queries, the user's use of results to search queries, a user's explicit rating of media content, a user's rating of an aspect of media content, such as a genre or other metadata relating to the media content, a user's rating of an actor, or other preference data.

The rating data may comprise explicit rating data assigned by a user, e.g., in a user preference profile, or rating data from other users, such as users in a community or ratings from other entities, such as ratings of a rating body, a critic's ratings or other rating data. In addition, rating data may comprise predicted rating data, such as a user's predicted rating for a particular media content item, which may be based on past ratings or ratings for fields of metadata, e.g., genre. The predicted rating may be generated when a user has not explicitly rated a media content item, and may be based on a parameters which include media content type, media content metadata, a user preference profile, community preference profile, or other rating data.

The system receives a result set responsive to a search, step 320, and the search results are weighted in accordance with a ranking algorithm, step 330. In some embodiments, the search result ranking is automatically or partially automatically generated on the basis of parameters using a relevance judgment algorithm, or other weighting algorithm, which includes, for example, weighting a result on the basis of a general popularity of the media content item (e.g., based on a number of user votes for a particular media content item, or other indicator of popularity), relational inferences, personal ratings (explicit and predicted based on, e.g., a user preference profile), global ratings, community preference profile, and proximities of the returned items.

In some embodiments, ranking algorithm of Table 3 may be used to rank media content items:

TABLE 3

$RS_{q,u,i} = \alpha * PX_{q,i} + (1 - \alpha) * AS_{u,i}$

In this ranking algorithm, a is a weight factor. $PX_{q,i}$ represents a relevance between query q and item i. $AS_{u,i}$ represents user u's rating for the item i. If the user provided an explicit rating of the item, the explicit rating is provided for $AS_{u,i}$. If the user has not provided an explicit rating of the item, the system generates a predicted rating of the item, or supplies a global rating for the item.

The system identifies metadata associated with each of the media content items included in the ranked search results, step 340. This may include, for example, identifying metadata associated with each media content item in a given result set, such as the actor, genre, plot summary, character or director of a movie included in the result set. This may further include identifying metadata associated with the media content item by querying a system data store or other system component. The system searches the data store for other media content items that match the identified metadata, step 350. The metadata search may provide results which include, for example, media content items associated with a particular actor, director, genre, plot summary, character or other metadata that is associated with the media content item in the ranked search results.

In addition, the metadata search may identify recommended or similar media content items based on media content items that have metadata related to metadata associated with the media content item included in a result set. Thus, the system provides a second set of search results, which includes the one or more media content items with metadata related to or matching the metadata associated with the media content included in the result set. In some embodiments, similar items of media content are obtained by analyzing metadata for media content items and a user preference profile using adjusted cosine similarity to calculate similarity, e.g., the similarity between movies i and j:

$$S(i, j) = \frac{\Sigma_{u \in U_{i,j}} (v_{u,i} - \overline{v}_u) \cdot (v_{u,j} - \overline{v}_u)}{\sqrt{\Sigma_{u \in U_i} (v_{u,i} - \overline{v}_u)^2} \cdot \sqrt{\Sigma_{u \in U_j} (v_{u,j} - \overline{v}_u)^2}}$$

$U_{i,j}$ and $U_i$ denote a set of users who vote or rate movies i and j and a set of users who vote or rate movie i, respectively. $v_{u,i}$ and $\overline{v}_u$ represent a user u's rating for an item i and the average rating of a user u.

The metadata search results are received by a system component, such as the metadata agent or other system component, step 360, and are weighed according to a ranking algorithm, step 370. The ranking algorithm may be one of the ranking algorithms discussed herein or other algorithms, which includes factors such as proximity, relevance or similarity, user preference profile, community preference profile, explicit ratings, predicted ratings, community ratings, global ratings, or other rating. The ranking algorithm may request user input to select between or identify criteria for ranking the search results. For example, the user may value global popularity more than his or her previous explicit ratings.

As discussed herein, the system transmits the result set to a client device, which may include the transmission of media content items, links to media content items, metadata for media content items, etc. Examples of the list of search results and related metadata are presented to a user as presented in the user interfaces illustrated in FIGS. 5-20.

One exemplary user preference profile is presented in the screen diagram illustrated at FIG. 5A. As shown in FIG. 5A, one aspect of a user preference profile is a user's current or prior search queries 420. Another aspect of a user preference profile includes a user's explicit ratings for certain movies 430. As shown, a user's movie ratings 430 may be provided in an A-F grading scale, or other rating scales known to those of skill in the art, such as one to five stars. For example, the section of a user preference profile for explicit ratings indicates that the user gave a high (A+) rating to movies such as "The Matrix" 432, "Judgment Day" 434 and "Star Wars" 436, whereas a low (F) rating was given to "Air Force One" 438. Another aspect of the user preference profile may include explicit ratings for actors 440, e.g., using an A-F grading scale, or other ranking scales known to those of skill in the art, such as one to five stars. As shown in FIG. 5A, the user gave a high (A+) rating to Al Pacino 442 and a low (F) rating to Sylvester Stallone 444. The user preference agent may store such rating information in a profile, which may also include data identifying the user and other user preference information. Other user preference information may include, for example, preferred movie genres, award winners, language preference, geographic location or other preferences.

The user preference profile also includes a list of recommended media content items on the basis of user preferences. Recommended media content items 680 and/or recommended actors, directors, etc. 690 are presented as links to web pages with information regarding the selected media content item or person. In general, the recommended media content items and people (e.g., directors, producers, cast and crew members) are generated in accordance with parameters such as a user preference profile, community preference profile, ranking or rating data, or other parameter. For example, cast and crew recommendations are generated based on a number of "A–" or highly rated movies either explicitly rated or predicted to be rated with which the cast and crew is associated.

The related media content items listed in connection with selected items from a result set, e.g., connected movies by common cast and crew member(s), similar movies, recommended movies, recommended cast/crew, etc., make it possible for a user to search for one media content item and quickly navigate through related media content, e.g., by selecting a web link, to obtain information about an unknown item of media content, or a media content items that may have been known, but which the user had no search terms with which to locate information about the media content item.

Figure 6:
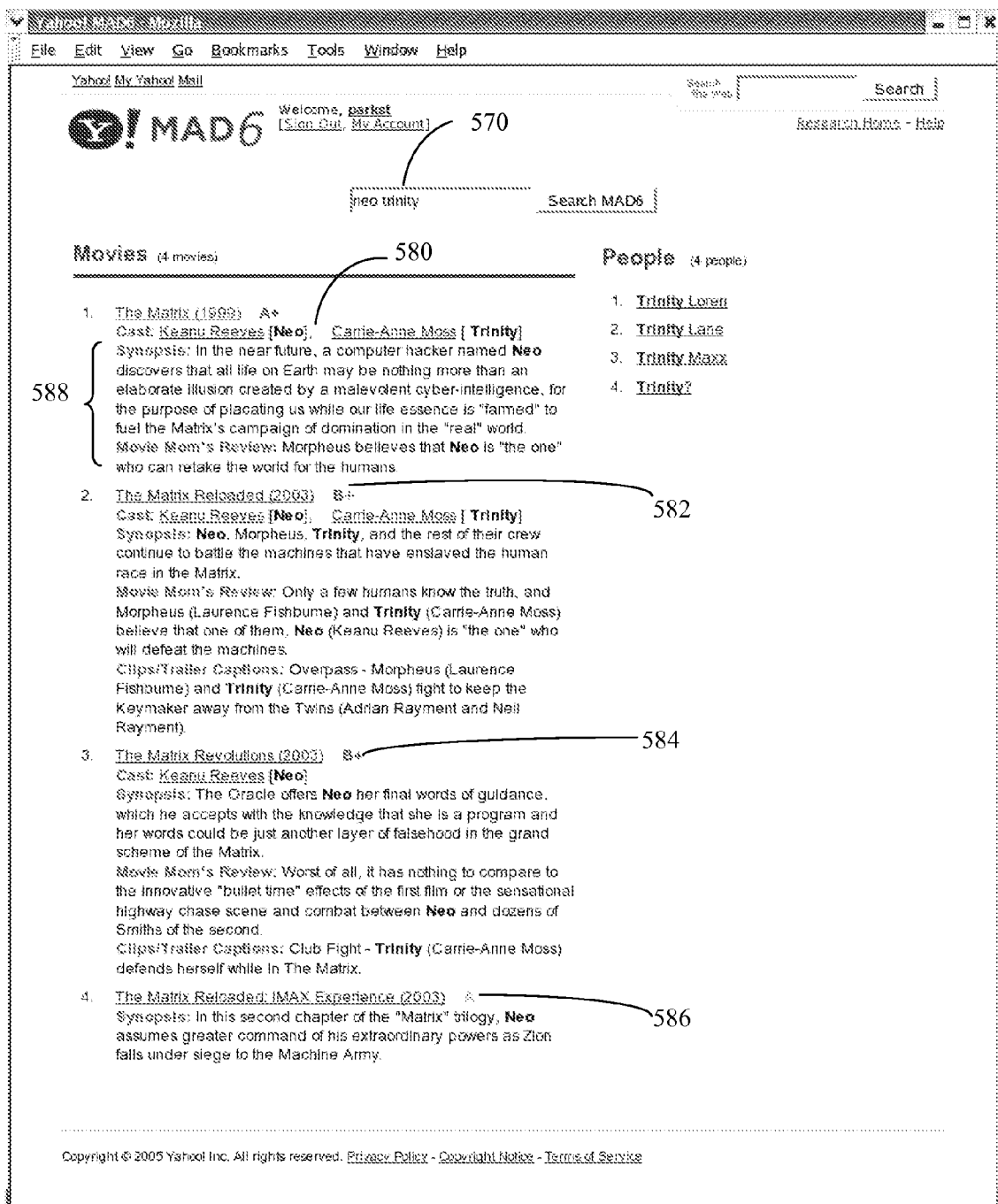
FIG. 6 is a screen shot of a result set generated in response to a search query according to one embodiment of the present invention.

An example of a result set generated in response to a search query and provided to a user is depicted in FIG. 6. As shown, the search query 570 including the keywords "neo trinity" returns a result set comprising four results 580, 582, 584, 586, respectively. Each of the items in the result set provides links to media content items that contain the characters "neo" and "trinity" in the metadata for the media content item, e.g., "The Matrix" movies. Each item in the result set is presented with associated cast and synopsis information 588, which may include additional information associated with the media content. In addition, each media content item is presented with one or more links, which when selected, lead to additional information about the media content such as cast and crew information. In some embodiments, selection of the links may provide one or more web pages comprising information regarding a selected item from the result set, such as the web pages depicted in FIG. 7.

Figure 7:
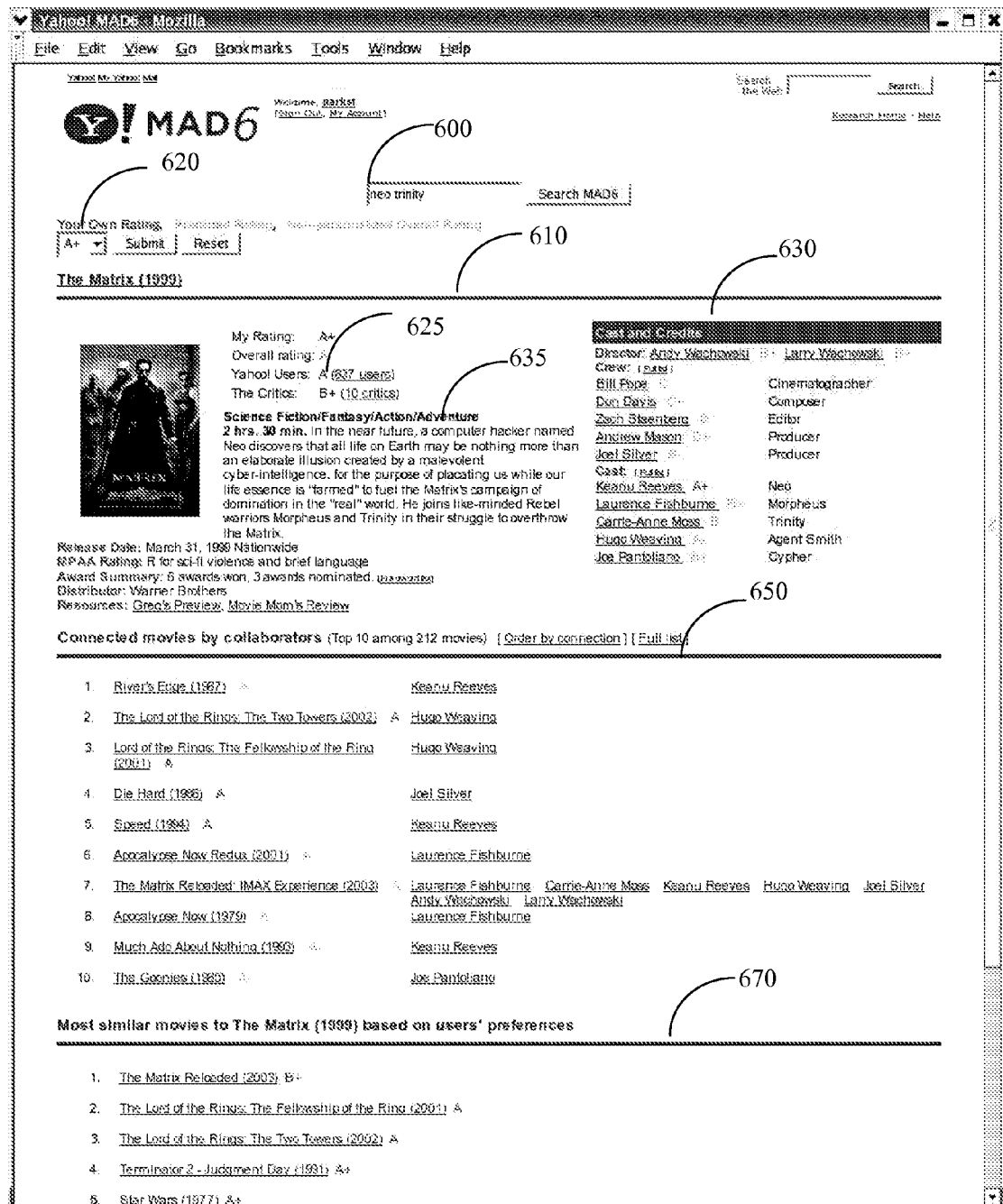
FIG. 7 is a screen shot of information relating to an item selected from one or more items in a result set according to one embodiment of the present invention.

FIG. 7 depicts a webpage including additional information about The Matrix 610 that may be viewed by selecting "The Matrix" link in the search results presented in the webpage depicted in FIG. 6. Information regarding the selected item includes a drop down list 620 for setting a rating for the media content item, for example using an A-F grade scale or other rating scales known to those of skill in the art, such as one to five stars. A user rating 620 may be stored as an explicit rating in a user preference profile, or may be used to build a community profile for the media content item. The explicit rating is included in rating information 625 for the media content item, which includes a user's own rating, an overall rating, and a community rating. These ratings may also be presented with a critic's rating or ratings from other sources. In addition, the search result may be presented with links to metadata items associated with the media content item, such as cast and credit information 630, a summary or synopsis of the media content item 635, media content previews, media content reviews and other metadata. Some of the metadata is presented as links such that a user may select a given link to obtain other media content items associated with each of the metadata items. For example, a user may select a link to a given director to obtain a web page that includes a list of links and information relating to other media content items with which the given director is associated.

According to the interface illustrated at FIG. 7, search results are presented together with links to media content items related to the search result(s), similar and recommended media content, or other media content related to a selected search result. Examples of such lists are shown in sections 650 and 670. As shown, the related media content list includes movies related to a selected movie, e.g., connected movies by common actors and crew members 650 and similar movies in user preferences 670. The connected movies list 650 may be generated by matching actors or crew members associated with the selected item of media content with other media content items with which the actor or crew member may be associated. As shown, movies including the actor Keanu Reeves and other actors in The Matrix are also presented 650. Each of the lists may be used to find and browse related media content items, e.g., by viewing a list of media content items having common collaborators 650, a user may find movies sharing actors or crew members.

The similar movies list 670 may be obtained by analyzing metadata regarding media content items, a user preference profile or other rating information. The similar movies list 670 presents media content items that are similar to a selected or viewed item of media content based on one or more user profiles. A user is presented with media content items that are similar to the media content item selected or viewed, which provides an easy way to browse similar media content options to locate an item of interest.

As stated above, some embodiments may enable a user to choose how the search results may be ranked, e.g., whether to apply personalized ranking or global ranking. If personalized ranking is selected, the system may search for user explicit ratings for content items. If the user has an explicit rating, then it becomes the rating of the content item. If not, the system may calculate a predicted rating of the content item for the given user, which becomes the rating of the content item for the given user. If the system fails to or cannot generate a predicted rating, then the system may use a non personalized global rating of the content item as a rating for the given user.

The system may enable the user to select global ranking alone. If global ranking is selected, the system may use only the global ratings, e.g., not the explicit and/or predicted ratings, of content items to rank the result set.

Other embodiments may enable the user to select parameters to use for the ranking function. For example, the system may provide four ranking options, e.g., Web Relevance, DB Relevance, Rating, and MADRank.

If Web relevance is selected, the system may score an item based on the item's relative position on the web search result within, for example, movies.yahoo.com.

If DB relevance is selected, the system may score based on database relevance score returned by MySql. To improve DB relevance, other programming library, such as Apache Lucene as found at web address lucene.apache.org/java/docs/, which is high-performance, full-featured text search engine library, can be used to calculate better relevance between a query and an items.

It will be appreciated that Web relevance and DB relevance may have the same result in both personalized and global ranking, since there are no personalized features in either.

If "Rating" is selected, the system may score an item based on the personalized ratings technique described above.

If MADRank is selected, then the system may score a given item based on following equation: MADRank=(Rating+argmax(DB−Relevance, Web−Relevance))/2. When a user choses "personalized ranking" and MADRank, then the system may compute the MADRank value where Rating is based on the personalized rating algorithm described above. If the user chooses global ranking and MADRank, then the system may compute the MADRank value where Rating is based on the global ranking algorithm discussed above.

Figure 19:
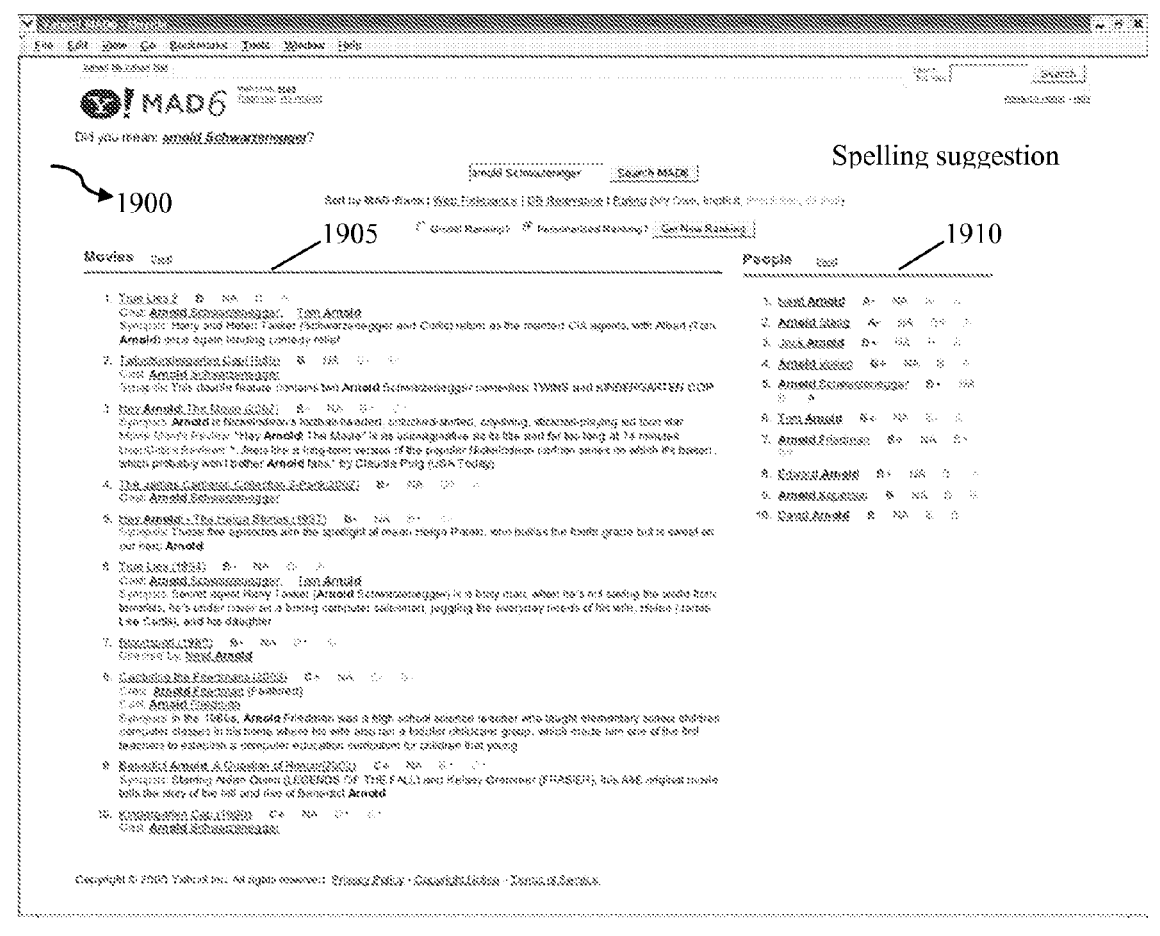
Figure 20:
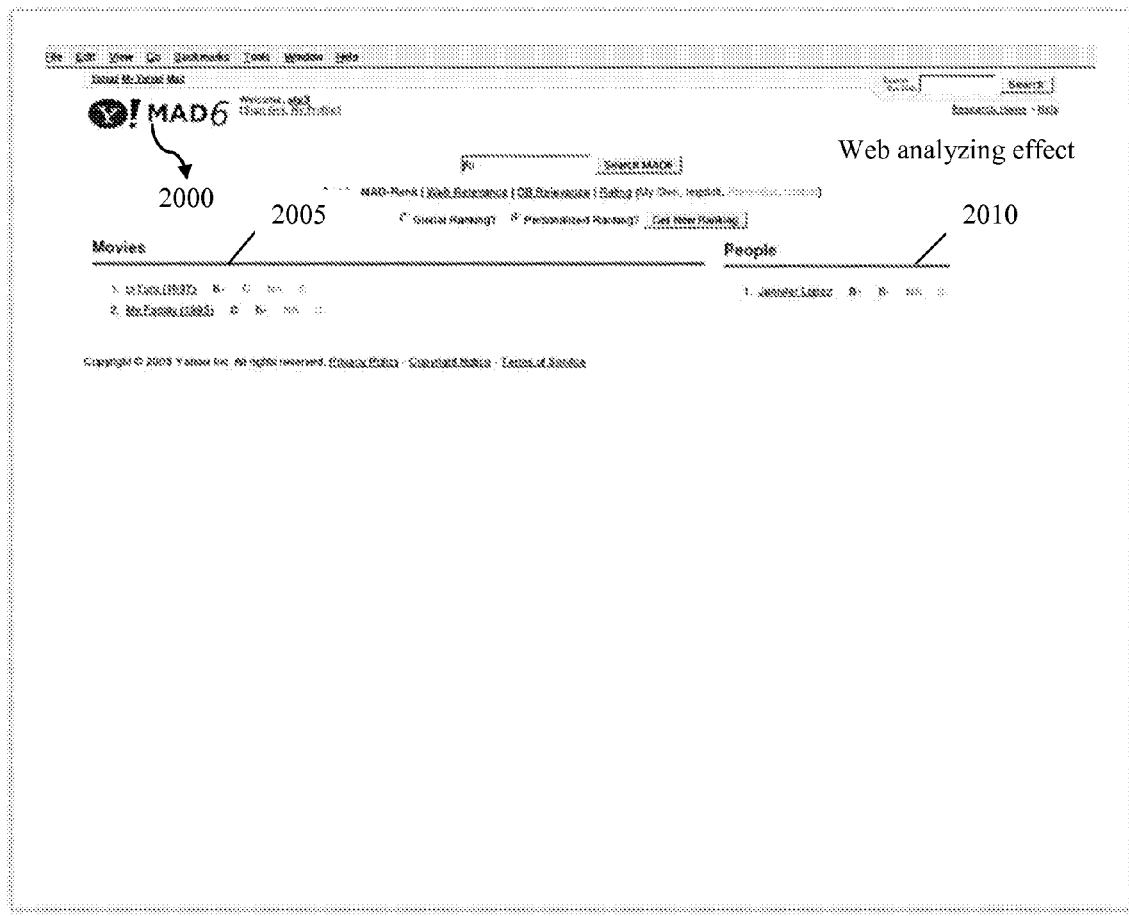
FIG. 20 is a screen shot of a web analyzing effect according to one embodiment of the invention.

Although not shown, the system may have a "Web Analyzer". The web analyzer may be operative to improve user experience. When a query comes from a user, the web analyzer may submit the query to the search technology, e.g., Yahoo Search Technology, to check for typo and get query suggestions. An example of spelling correction is shown in FIG. 19. Also, the web analyzer may submit a modified query such as "jlo site:movies.yahoo.com" if the query is "jlo" (the nickname of Jennifer Lopez). The web analyzer may receive the top 50 search results from the search technology to identify movies, people and their ranking. One example formula that may be used is $WR\_i=(51-Rank\_i)*13/50$. If a movie appears first, then its web relevance weighting becomes 13. This ranking may be used to supplement Database relevance. For example, FIG. 20 shows "Jennifer Lopez" ranking first even though no items from the DB are extracted. Since performance of general search engines is getting better, the system can take advantage of their performance improvements.

Several example screen shots of various embodiments follow.

Figure 8:
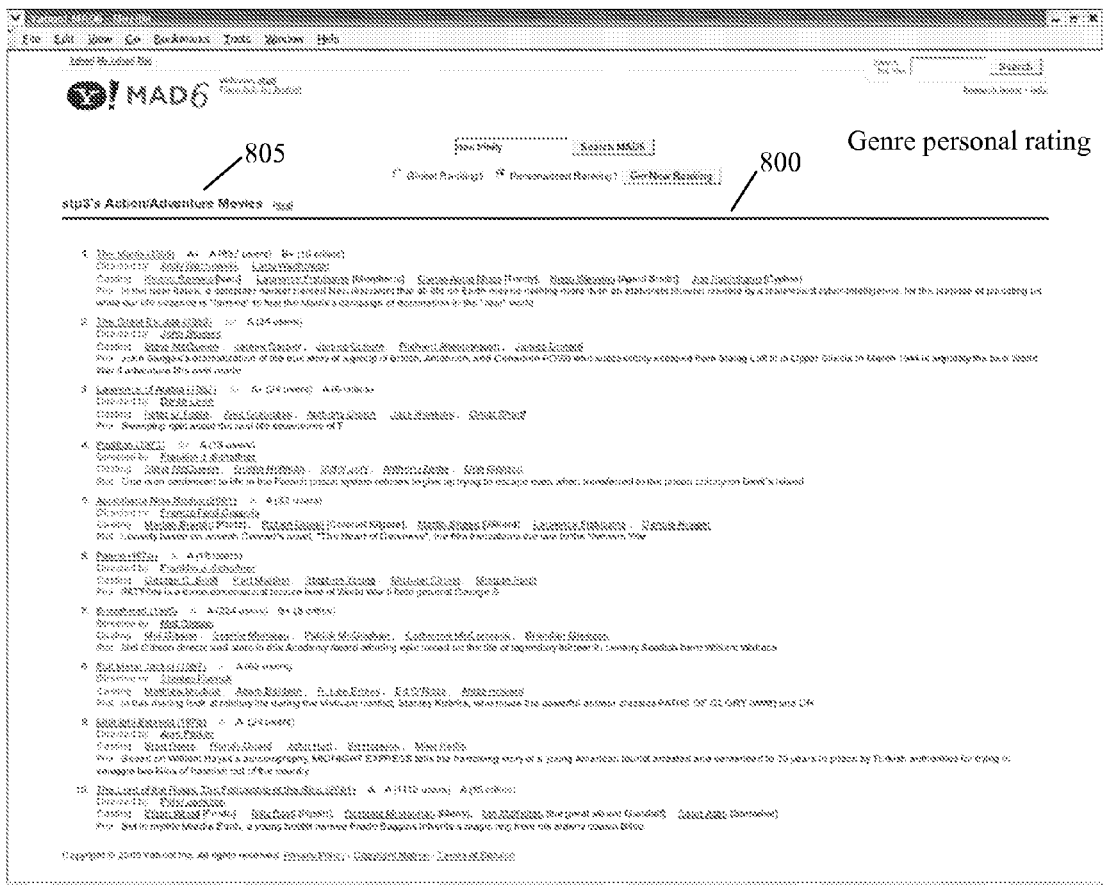
FIG. 8 is a screen shot of a personalized result set generated in to the selection of a genre in the user profile according to one embodiment of the invention.

FIG. 8 is a screen shot of a personalized result set 800 generated in response to a search query based on genre 805, according to one embodiment of the invention. When a user clicks on a genre in his profile page (e.g., action/adventure), the system presents, for example, the top ten movies in the genre based on the user preferences (explicit and predicted ratings).

Figure 9:
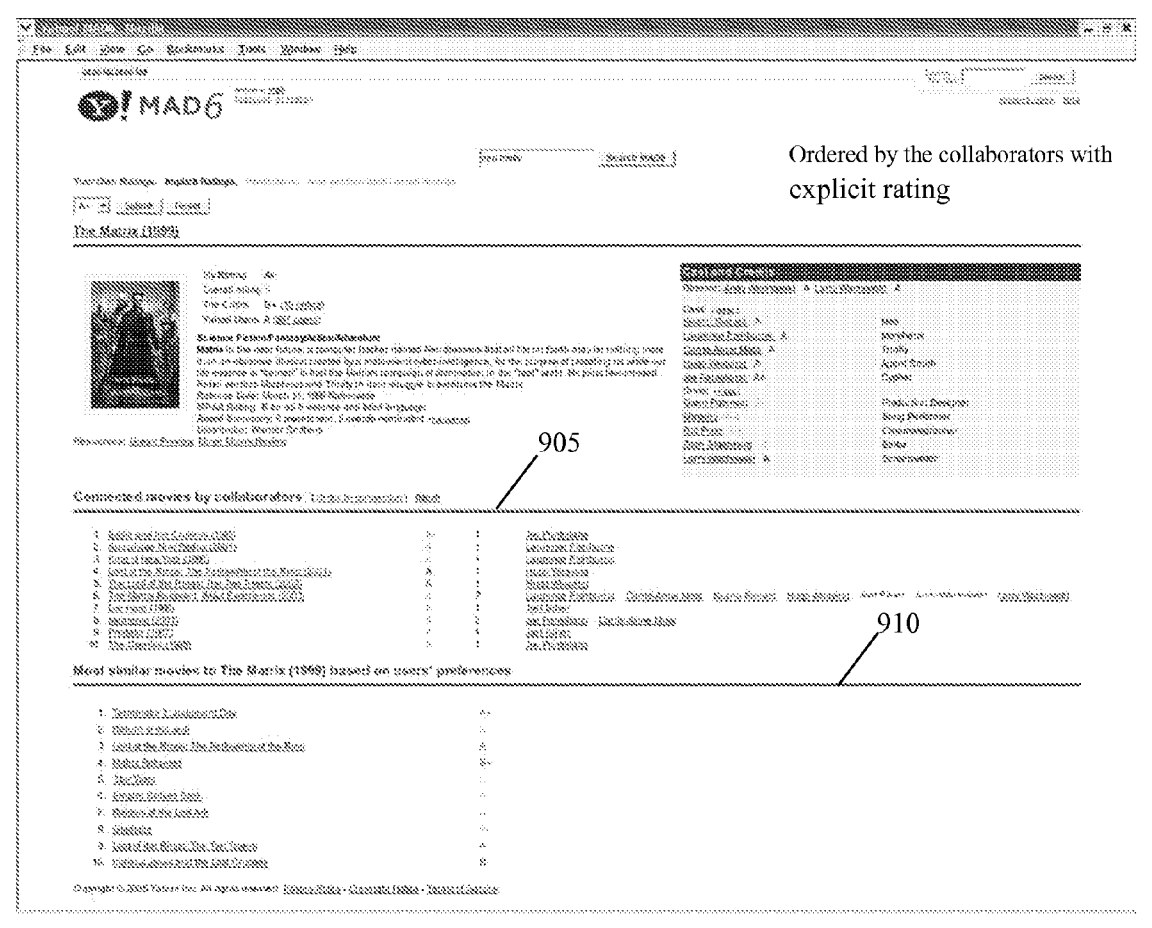

FIG. 9 is a screen shot of a selected movie (which is rated A+ by the user), with movies 905 connected by common cast and crew members and ranked based on the number of cast and crew members between two movies and similar movies 910 ranked based on item similarities in user preferences according to one embodiment of the invention.

Figure 10:
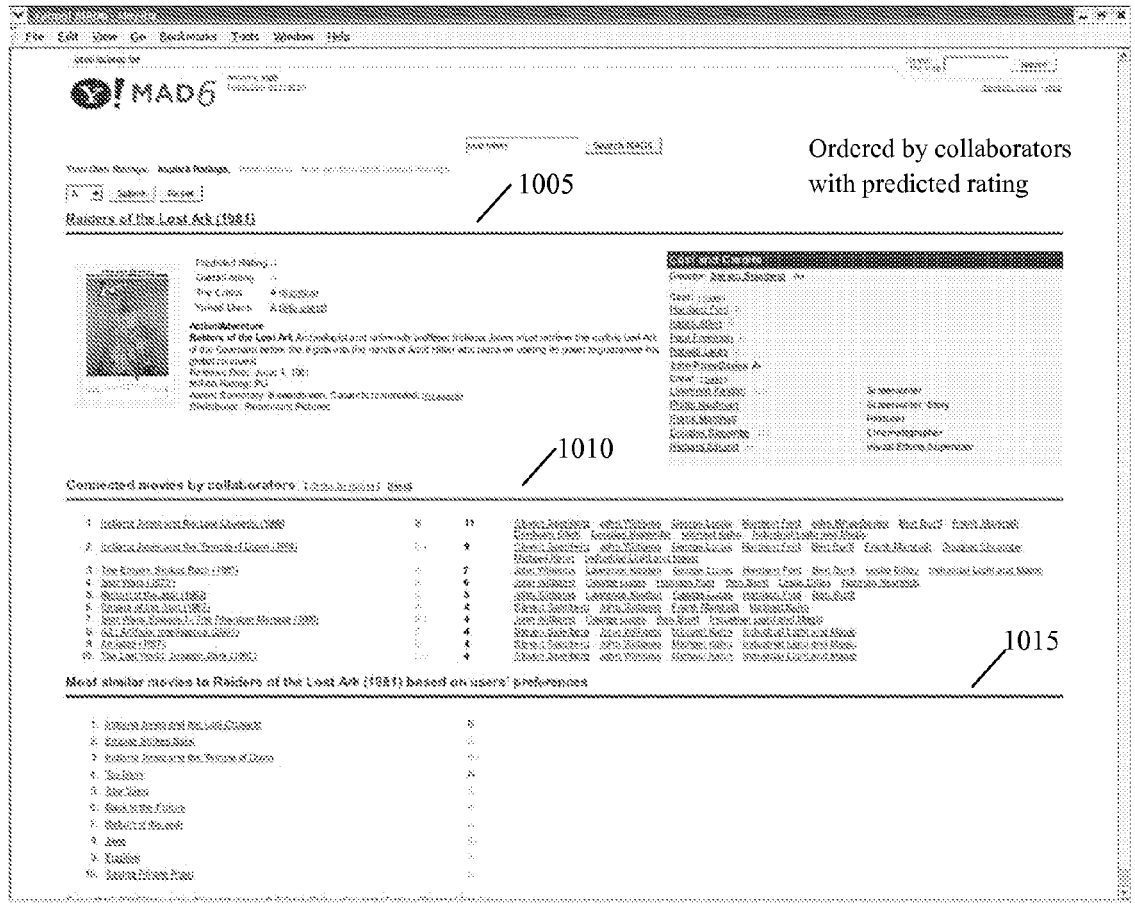
FIG. 10 is a screen shot of a movie selection, for which the system provides a preference prediction of the item for the user, with connected movies ordered by the number of common cast and crew members between two movies and related movies based on item similarities in accordance with user preferences according to one embodiment of the invention.

FIG. 10 is a screen shot of a selected movie 1005, which a personalizer component generates a predicted rating for a user using one or more profiles, with movies 1010 connected by common cast and crew members and ranked based on the number of common cast and crew members between two movies and similar movies 1015 ranked based on item similarities in user preferences according to one embodiment of the invention.

Figure 11:
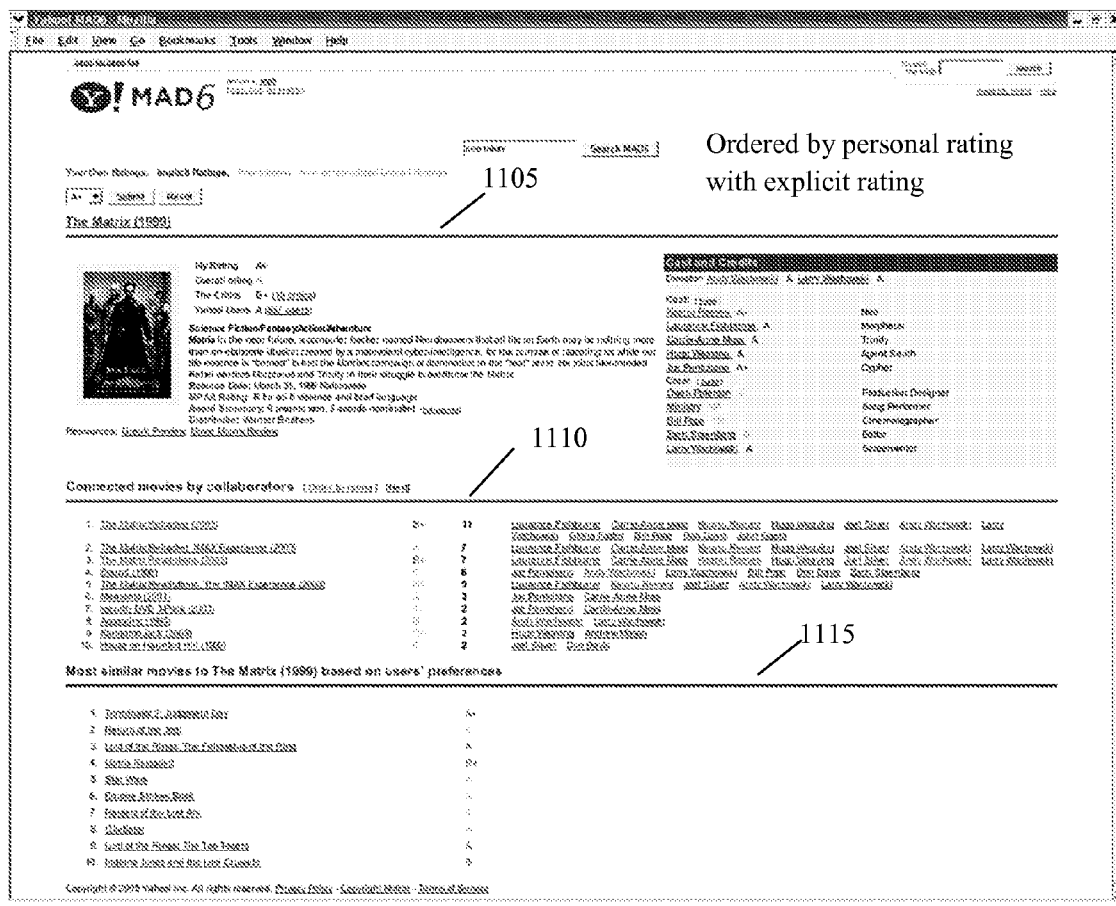
FIG. 11 is a screen shot of a movie selection with connected movies based on common cast and crew members ordered by personalized ratings and related movies based on item similarities with user preferences according to one embodiment of the invention.

FIG. 11 is a screen shot of a selected movie 1105 (rated A+ by the user), with movies 1110 connected by common cast and crew members ordered by personalized ratings and similar movies 1115 ordered by item similarities in user preferences according to one embodiment of the invention.

Figure 12B:
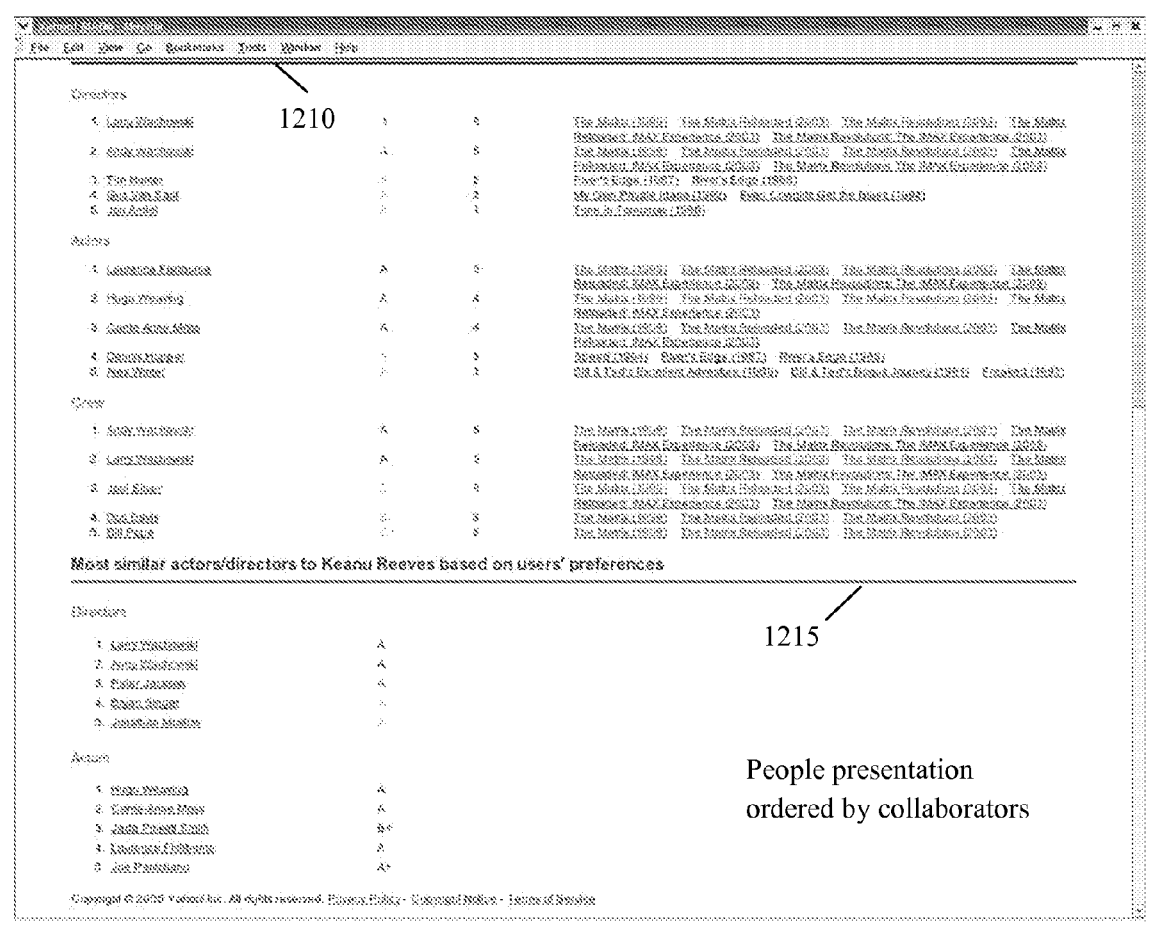

FIGS. 12A and 12B are a screen shot of a people presentation 1205 with collaborators 1210 similar actors and directors 1215 based on user preferences, according to one embodiment of the invention.

Figure 13A:
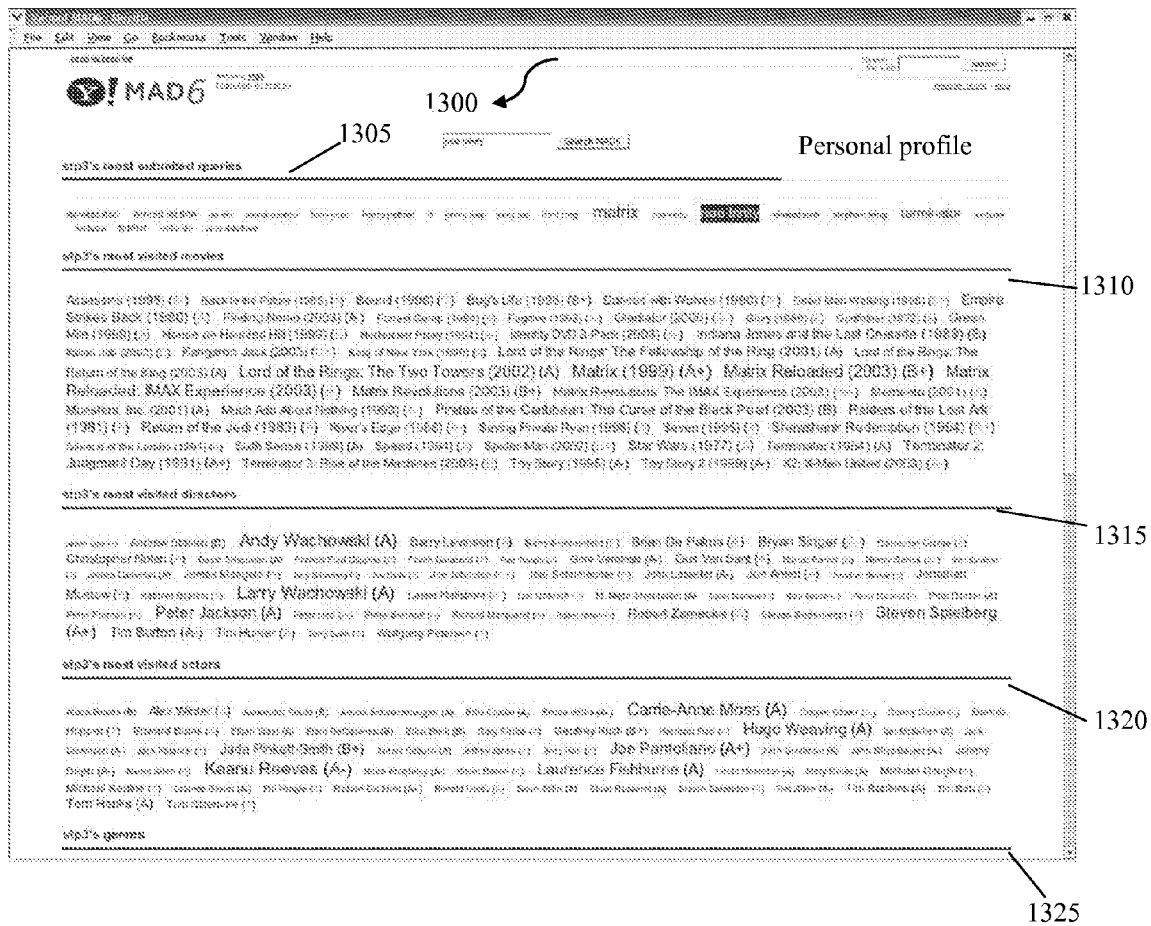
FIGS. 13A and 13B illustrate a user preference profile in accordance with an embodiment of the present invention.
Figure 13B:
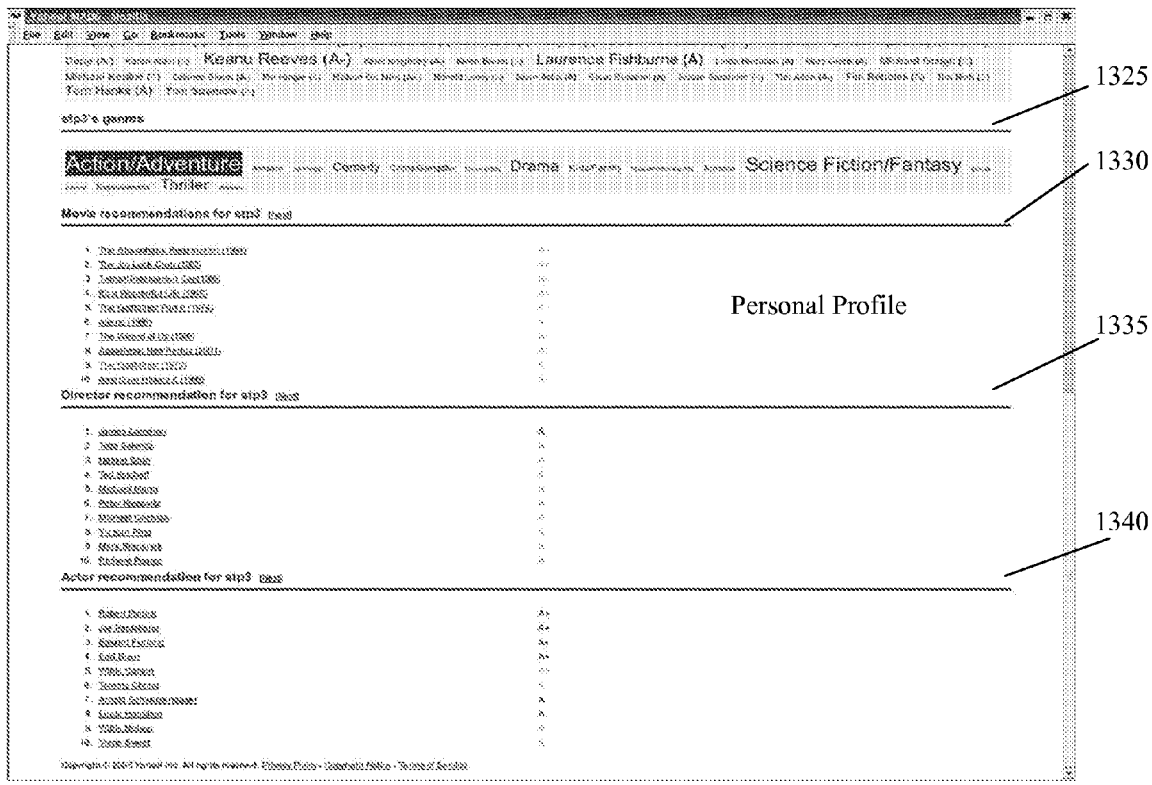

FIGS. 13A and 13B illustrate a user preference profile 1300 in accordance with an embodiment of the present invention. The user preference profile 1300 includes the user's most frequent queries 1305, the user's most visited movies 1310, the user's most visited directors 1315, the user's most visited actors 1320, the user's selected genre favorites 1325, the user's top ten movie recommendations 1330, the user's top ten director recommendations 1335, and the user's top ten actor recommendations 1340. In 1310, 1315, 1320 and 1325, font size represents visit frequency. For example, the font size in the section of "most frequently used queries" indicates how often the query has been submitted by the user. Global information for all users may be shown when a user is not logged in.

Figure 14:
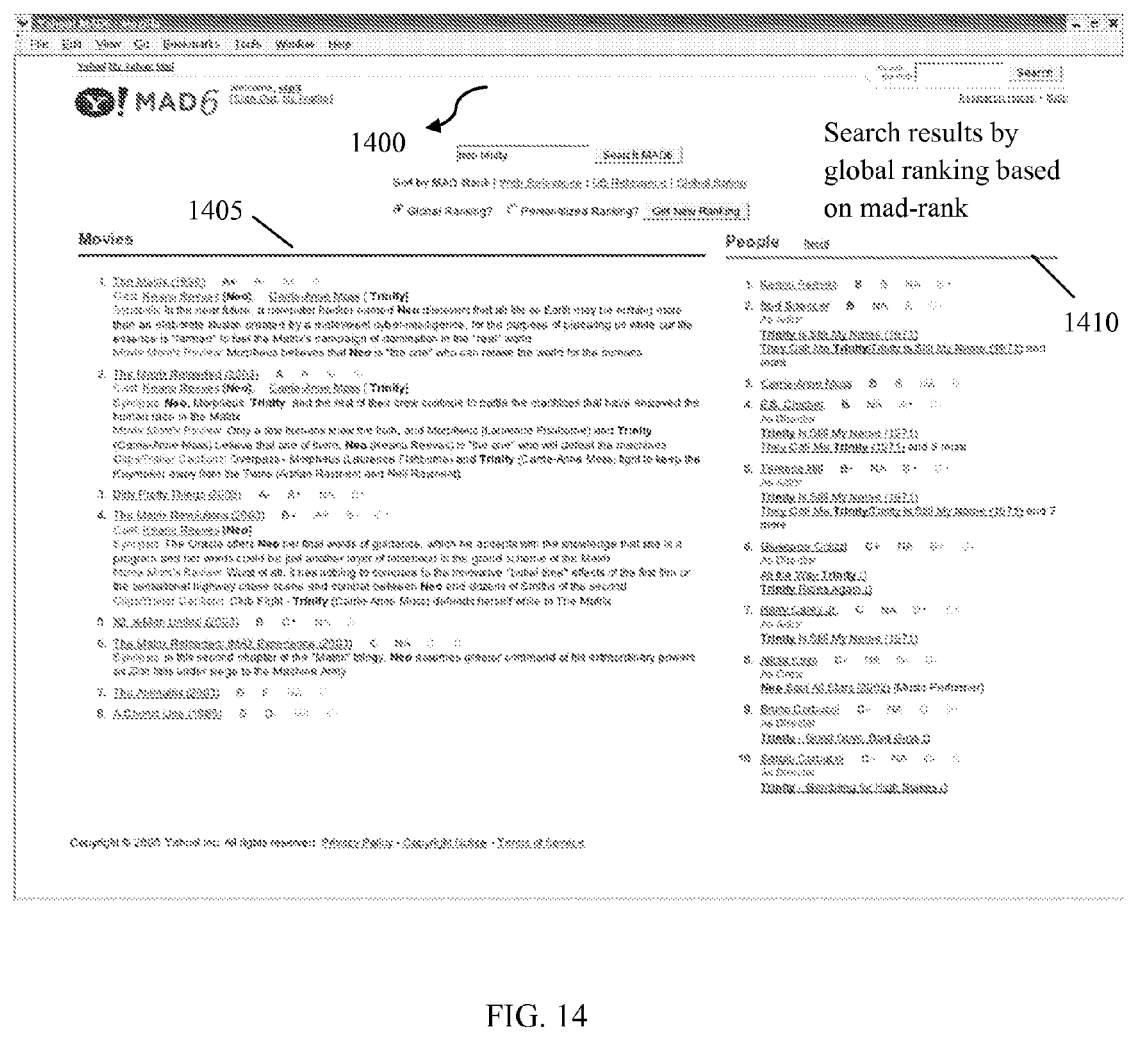

FIG. 14 is a screen shot of search results 1400 including movies 1405 and actors, directors, crew, etc. 1410 ranked by global ranking based on MADRank according to one embodiment of the invention.

Figure 15:
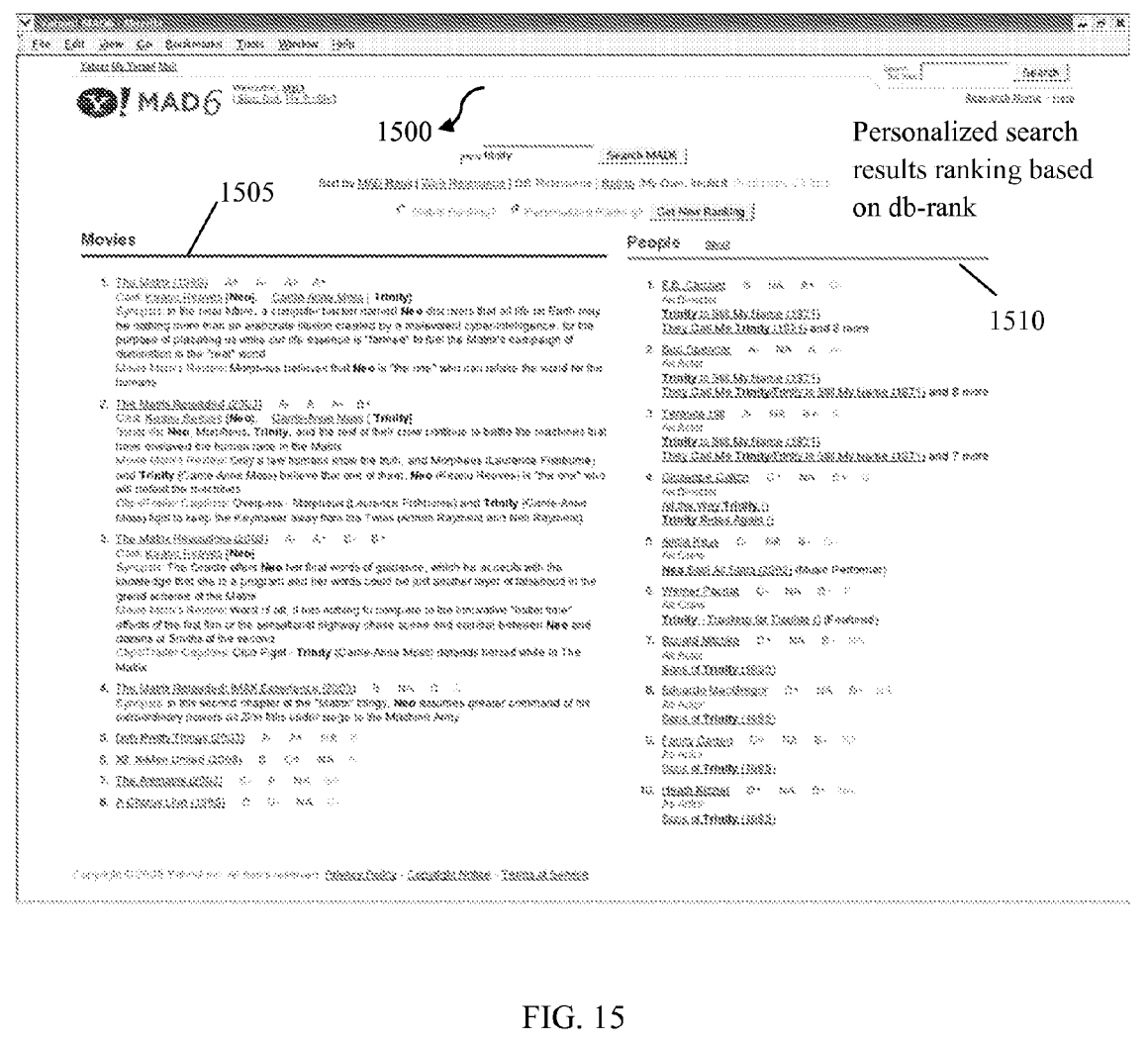

FIG. 15 is a screen shot of search results 1500 including movies 1505 and actors, directors, crew, etc. 1510 ranked using personalized ranking based on DB-Rank according to one embodiment of the invention.

Figure 16:
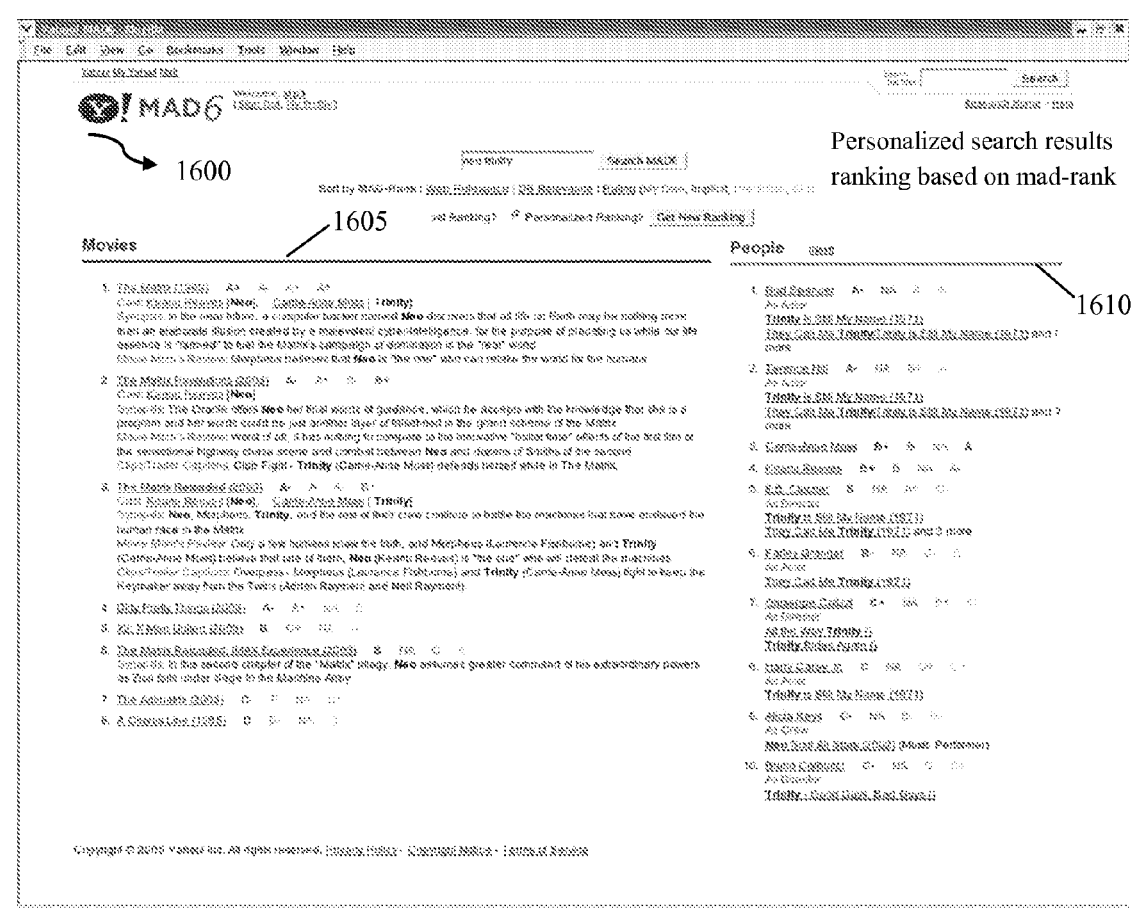

FIG. 16 is a screen shot of search results 1600 including movies 1605 and actors, directors, crew, etc. 1610 ranked by personalized ranking based on MADRank according to one embodiment of the invention.

Figure 17:
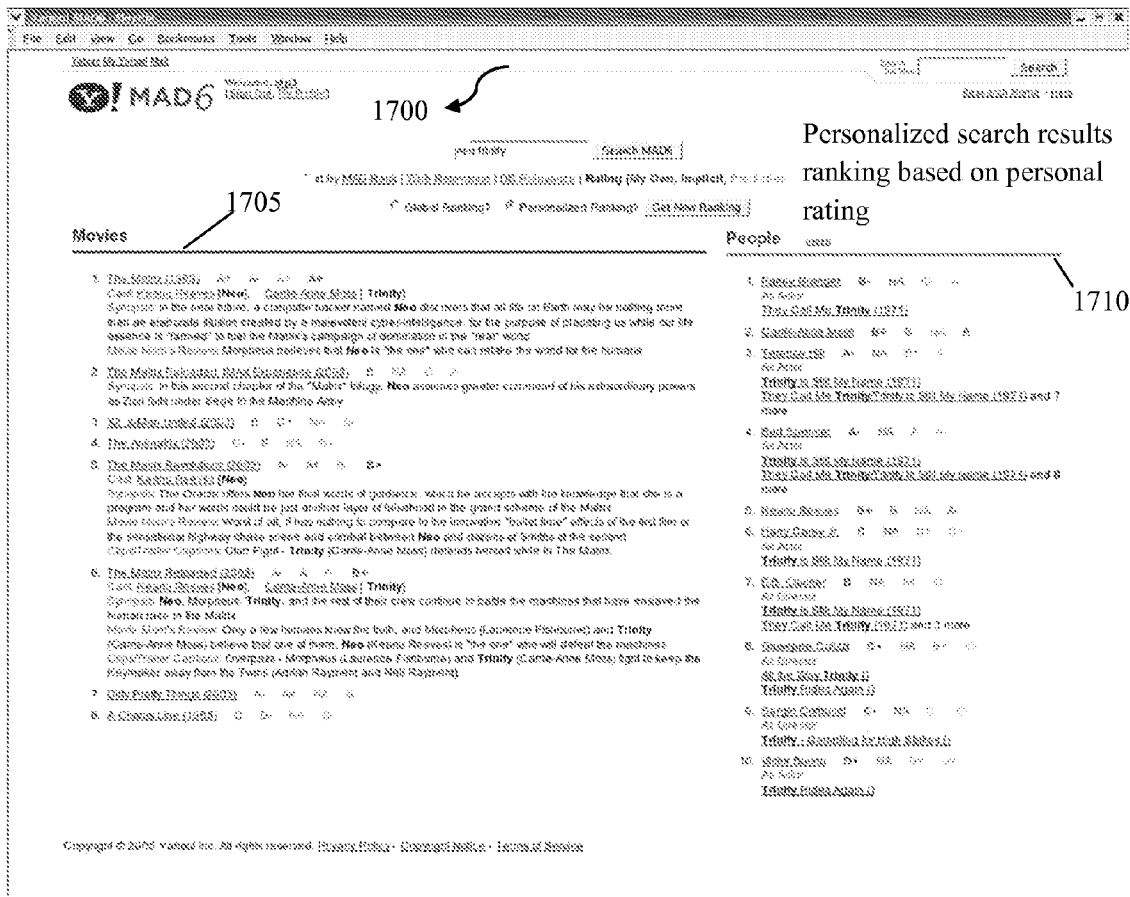
FIG. 17 is a screen shot of personalized search results by ranking based on personal rating according to one embodiment of the invention.

FIG. 17 is a screen shot of search results 1700 including movies 1705 and actors, directors, crew, etc. 1710 ranked by personalized ranking based on rating according to one embodiment of the invention.

Figure 18:
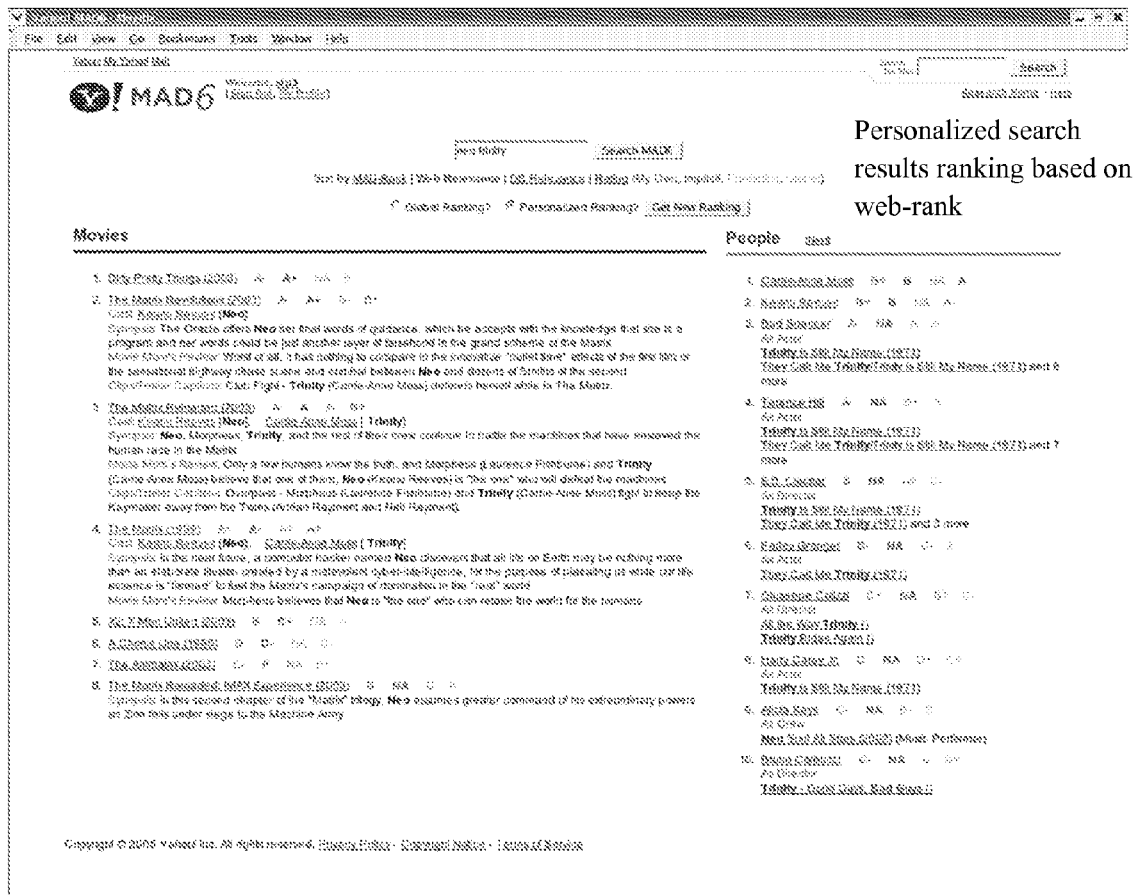
FIG. 18 is a screen shot of personalized search results by ranking based on Web Relevance according to one embodiment of the invention.

FIG. 18 is a screen shot of search results 1800 including movies 1805 and actors, directors, crew, etc. 1810 ranked by personalized ranking based on Web Relevance according to one embodiment of the invention.

FIG. 19 is a screen shot of search results 1900 from a misspelled set of keywords according to one embodiment of the invention. The search results 1900 includes movies 1905 with "Arnold Schwarzenegger" at the first rank and various other possible actors, directors, crew, etc. 1910. The system ranks the search results by personalized raking based on MADRank.

FIG. 20 is a screen shot of search results 2000 using a web analyzing effect according to one embodiment of the invention. The search results 2000 in response to the search query "jlo" include movies 2005 and actors, directors, crew, etc. 2010 for the person with the nickname "jlo", namely, Jennifer Lopez. The results are ordered by personalized ranking based on MADRank.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computerized method comprising:
receiving a search query to generate a search result of one or more media items;
providing a personalized search rank of the one or more media items on the basis of a user profile and an item relevance for a given media item with regard to the query, the user profile including genre preferences, actor preferences, search histories, search result interactions, and items viewed, ordered or utilized by a user of the user profile;
identifying, via a processing device, metadata associated with the search result;
using the metadata associated with the search result to identify, via the processing device, a set of related media items, the related media items identified based on a movie-casting graph and a movie-user graph, the movie-casting graph including associations between one or more movies and one or more actors, and the movie-user graph including associations between one or more movies rated by the user, wherein the movie-casting and the movie-user graphs are generated using metadata associated with the one or more media items;
generating one or more unigram scores by counting a number of unigrams in the search query that appear in or match one or more metadata fields associated with the one or more media items, wherein a given metadata field comprises metadata identifying a given media item;
generating one or more bigram scores by counting a number of bigrams in the search query that appear in or match one or more metadata fields associated with the one or more media items;
generating a proximity score for the one or more media items by combining the one or more bigram scores and the one or more unigram scores, the bigram score having a greater weight than the unigram score in generating the proximity score;
generating an authority value for the one or more media items, wherein the authority value is based on a personalized search rank of the one or more media items, the personalized search rank of the one or more media items including, for each of the one or more media items, an explicit rating, a predicted rating based on the user profile, and a global popularity, wherein one or more weights are assigned to the explicit rating, the predicted rating and the global popularity based on the user profile in generating the authority value;
combining the proximity score and the authority value for the one or more media items;
ranking, via the processing device, the one or more media items based on the combined proximity score and authority value;
providing the ranked one or more media items in the search result along with the identified set of related media items.

2. The method of claim 1 further comprising tracking activity on the media items of the search result, and storing the tracked data in a preference profile.

3. The method of claim 1 wherein the personalized search rank is determined according to a preference profile.

4. The method of claim 1 wherein the item relevance comprises a web relevance.

5. The method of claim 1 wherein the item relevance comprises a DB relevance.

6. The method of claim 1 wherein the at least one related media item comprises one or more movies connected by common cast and crewmembers.

7. The method of claim 1 wherein the at least one related media item comprises one or more movies connected by item similarities in user preferences.

8. Non-transitory computer readable media comprising:
a search engine operative to receive a search query and generating a search result of one or more media items, the search result organized in accordance with a personalized search rank on the basis of a user profile and an item relevance for a given media item with regard to the query, the user profile including genre preferences, actor preferences, search histories, search result interactions, and items viewed, ordered or utilized by a user of the user profile;

a user preference agent coupled to the search engine and operative to identify metadata associated with the search result and operative to use the metadata associated with the search result to identify a set of related media items, the related media items identified based on a movie-casting graph and a movie-user graph, the movie-casting graph including associations between one or more movies and one or more actors, and the movie-user graph including associations between one or more movies rated by the user, wherein the movie-casting graph and the movie-user graphs generated by a graph generator using metadata associated with the one or more media items;

a score generator operative to generate one or more unigram scores by counting a number of unigrams in the search query that appear in or match the one or more metadata fields associated with the one or more media items, wherein a given metadata field comprises metadata identifying a given media item;

a score generator operative to generate one or more bigram scores by counting a number of bigrams in the search query that appear in or match in the one or more metadata fields associated with the one or more media item;

a score generator operative to generate a proximity score for the one or more media items by combining the one or more bigram scores and the one or more unigram scores, the bigram score having a greater weight than the unigram score in generating the proximity score;

a value generator operative to generate an authority value, wherein the authority value is based on a personalized search rank of the one or more media items, the personalized search rank of the one or more media items including, for each of the one or more media items, an explicit rating, a predicted rating based on the user profile, and a global popularity, wherein one or more weights are assigned to the explicit rating, the predicted rating and the global popularity based on the user profile in generating the authority value;

a combiner operative to combine the proximity score and the authority value; and a ranking component operative to rank, via the processing device, the one or more media items based on the combined proximity score and authority value; and an interface component operative to provide the ranked one or more media items in the search result along with the identified set of related media items.

9. The non-transitory computer readable media of claim 8 further comprising interface components for tracking activity on the media items of the search result, and storing the tracked data in a preference profile.

10. The non-transitory computer readable media of claim 8 wherein the personalized search rank is determined in accordance with a preference profile.

11. The non-transitory computer readable media of claim 8 wherein the item relevance comprises a web relevance.

12. The non-transitory computer readable media of claim 8 wherein the item relevance comprises a DB relevance.

13. The non-transitory computer readable media of claim 8 wherein the at least one related media item comprises one or more movies connected by at least one common cast and crewmember.

14. The non-transitory computer readable media of claim 8 wherein the at least one related media item comprises one or more movies connected by item similarities based on user preferences.

15. A system comprising:
a memory device having executable instructions stored therein; and
a processing device, in response to the executable instructions, operative to:
receive a search query to generate a search result of one or more media items;
provide a personalized search rank of the one or more media items on the basis of a user profile and an item relevance for a given media item with regard to the query, the user profile including genre preferences, actor preferences, search histories, search result interactions, and items viewed, ordered or utilized by a user of the user profile;
identify metadata associated with the search result;
use the metadata associated with the search result to identify a set of related media items, the related media items identified based on a movie-casting graph and a movie-user graph, the movie-casting graph including associations between one or more movies and one or more actors, and the movie-user graph including associations between one or more movies rated by the user, wherein the movie-casting graph and the movie-user graphs are generated using metadata associated with the one or more media items;
generate one or more unigram scores by counting a number of unigrams in the search query that appear in or match one or more metadata fields associated with the one or more media items, wherein a given metadata field comprises metadata identifying a given media item;
generate one or more bigrams score by counting a number of bigrams in the search query that appear in or match the one or more metadata fields associated with the one or more media items;
generate a proximity score for the one or more media items by combining the one or more bigram scores and the one or more unigram scores, the bigram score having a greater weight than the unigram score in generating the proximity score;
generate an authority value, wherein the authority value is based on a personalized search rank of the one or more media items, the personalized search rank of the one or more media items including, for each of the one or more media items, an explicit rating, a predicted rating based on the user profile, and a global popularity, wherein one or more weights are assigned to the explicit rating, the predicted rating and the global popularity based on the user profile in generating the authority value;
combine the proximity score and the authority value;
rank, via the processing device, the one or more media items based on the combined proximity score and authority value; and
provide the ranked one or more media items in the search result along with the identified set of related media items.

* * * * *